(12) United States Patent
Newman

(10) Patent No.: US 10,708,547 B2
(45) Date of Patent: Jul. 7, 2020

(54) USING VEHICLE SENSOR DATA TO MONITOR ENVIRONMENTAL AND GEOLOGIC CONDITIONS

(71) Applicant: NIO USA, Inc., San Jose, CA (US)

(72) Inventor: Austin Newman, San Jose, CA (US)

(73) Assignee: NIO USA, Inc., San Jose, CA (US)

( * ) Notice: Subject to any disclaimer, the term of this patent is extended or adjusted under 35 U.S.C. 154(b) by 108 days.

(21) Appl. No.: 15/366,628

(22) Filed: Dec. 1, 2016

(65) Prior Publication Data

US 2018/0139415 A1 May 17, 2018

Related U.S. Application Data

(60) Provisional application No. 62/421,011, filed on Nov. 11, 2016.

(51) Int. Cl.
| | |
|---|---|
| *H04W 4/80* | (2018.01) |
| *G06K 9/00* | (2006.01) |
| *H04N 7/18* | (2006.01) |
| *G06K 9/20* | (2006.01) |
| *H04N 5/14* | (2006.01) |
| (Continued) | |

(52) U.S. Cl.
CPC ......... *H04N 7/181* (2013.01); *G06K 9/00805* (2013.01); *G08B 27/001* (2013.01); *G08G 1/0112* (2013.01); *G08G 1/0129* (2013.01); *G08G 1/0133* (2013.01); *G08G 1/0141* (2013.01); *G08G 1/04* (2013.01); *G08G 1/0962* (2013.01); *H04N 1/00209* (2013.01); *H04N 1/00244* (2013.01); *G06K 2009/00738* (2013.01); *G08B 17/00* (2013.01); *G08B 21/12* (2013.01)

(58) Field of Classification Search
CPC .... G06K 9/00805; G08B 25/00; G08B 25/10; G08B 27/001; G08G 1/0112; G08G 1/0129; G08G 1/0133; G08G 1/0141; G08G 1/04; G08G 1/0962; H04N 1/00209; H04N 1/00244; H04N 7/181
See application file for complete search history.

(56) References Cited

U.S. PATENT DOCUMENTS

| | | |
|---|---|---|
| 4,361,202 A | 11/1982 | Minovitch |
| 4,476,954 A | 10/1984 | Johnson et al. |
| | (Continued) | |

FOREIGN PATENT DOCUMENTS

| | | |
|---|---|---|
| CN | 1417755 | 5/2003 |
| CN | 1847817 | 10/2006 |
| | (Continued) | |

OTHER PUBLICATIONS

Eriksson et al., "The Pothole Patrol", Proceeding of the 6th International Conference on Mobile Systems, Applications, and Services—Mobisys '08 (2008): n. pag.

(Continued)

*Primary Examiner* — Francis Geroleo
(74) *Attorney, Agent, or Firm* — Sheridan Ross, P.C.

(57) ABSTRACT

A system and method for monitoring environmental and geological conditions based upon information is collected by a wide array of sensors already included in modern motor vehicles. Also included is a system for monitoring environmental and geological conditions by aggregating data collected by an array of vehicles.

12 Claims, 12 Drawing Sheets

(51) Int. Cl.
  *G08B 27/00* (2006.01)
  *H04N 1/00* (2006.01)
  *G08G 1/01* (2006.01)
  *G08G 1/0962* (2006.01)
  *G08G 1/04* (2006.01)
  *G08B 17/00* (2006.01)
  *G08B 21/12* (2006.01)

(56) References Cited

U.S. PATENT DOCUMENTS

| | | | |
|---|---|---|---|
| 4,754,255 | A | 6/1988 | Sanders et al. |
| 4,875,391 | A | 10/1989 | Leising et al. |
| 5,136,498 | A | 8/1992 | McLaughlin et al. |
| 5,204,817 | A | 4/1993 | Yoshida |
| 5,363,306 | A | 11/1994 | Kuwahara et al. |
| 5,508,689 | A | 4/1996 | Rado et al. |
| 5,521,815 | A | 5/1996 | Rose |
| 5,529,138 | A | 6/1996 | Shaw et al. |
| 5,531,122 | A | 7/1996 | Chatham et al. |
| 5,572,450 | A | 11/1996 | Worthy |
| 5,610,821 | A | 3/1997 | Gazis et al. |
| 5,648,769 | A | 7/1997 | Sato et al. |
| 5,666,157 | A | 9/1997 | Aviv |
| 5,710,702 | A | 1/1998 | Hayashi et al. |
| 5,794,164 | A | 8/1998 | Beckert et al. |
| 5,797,134 | A | 8/1998 | McMillan et al. |
| 5,812,067 | A | 9/1998 | Bergholz et al. |
| 5,825,283 | A | 10/1998 | Camhi |
| 5,838,251 | A | 11/1998 | Brinkmeyer et al. |
| 5,847,661 | A | 12/1998 | Ricci |
| 5,890,080 | A | 3/1999 | Coverdill et al. |
| 5,928,294 | A | 7/1999 | Zelinkovsky |
| 5,949,345 | A | 9/1999 | Beckert et al. |
| 5,983,161 | A | 11/1999 | Lemelson et al. |
| 5,986,575 | A | 11/1999 | Jones et al. |
| 6,038,426 | A | 3/2000 | Williams, Jr. |
| 6,081,756 | A | 6/2000 | Mio et al. |
| D429,684 | S | 8/2000 | Johnson |
| 6,128,003 | A | 10/2000 | Smith et al. |
| 6,141,620 | A | 10/2000 | Zyburt et al. |
| 6,148,261 | A | 11/2000 | Obradovich et al. |
| 6,152,514 | A | 11/2000 | McLellan |
| 6,157,321 | A | 12/2000 | Ricci |
| 6,198,996 | B1 | 3/2001 | Berstis |
| 6,199,001 | B1 | 3/2001 | Ohta et al. |
| 6,202,008 | B1 | 3/2001 | Beckert et al. |
| 6,252,544 | B1 | 6/2001 | Hoffberg |
| 6,267,428 | B1 | 7/2001 | Baldas et al. |
| 6,302,438 | B1 | 10/2001 | Stopper, Jr. et al. |
| 6,310,542 | B1 | 10/2001 | Gehlot |
| 6,317,058 | B1 | 11/2001 | Lemelson et al. |
| 6,339,826 | B2 | 1/2002 | Hayes, Jr. et al. |
| 6,356,838 | B1 | 3/2002 | Paul |
| 6,388,579 | B1 | 5/2002 | Adcox et al. |
| 6,480,224 | B1 | 11/2002 | Brown |
| 6,502,022 | B1 | 12/2002 | Chastain et al. |
| 6,519,519 | B1 | 2/2003 | Stopczynski |
| 6,557,752 | B1 | 5/2003 | Yacoob |
| 6,563,910 | B2 | 5/2003 | Menard et al. |
| 6,587,739 | B1 | 7/2003 | Abrams et al. |
| 6,598,227 | B1 | 7/2003 | Berry et al. |
| 6,607,212 | B1 | 8/2003 | Reimer et al. |
| 6,617,981 | B2 | 9/2003 | Basinger |
| 6,662,077 | B2 | 12/2003 | Haag |
| 6,675,081 | B2 | 1/2004 | Shuman et al. |
| 6,678,747 | B2 | 1/2004 | Goossen et al. |
| 6,681,176 | B2 | 1/2004 | Funk et al. |
| 6,690,260 | B1 | 2/2004 | Ashihara |
| 6,690,940 | B1 | 2/2004 | Brown et al. |
| 6,724,920 | B1 | 4/2004 | Berenz et al. |
| 6,747,687 | B1 | 6/2004 | Alves |
| 6,754,580 | B1 | 6/2004 | Ask et al. |
| 6,757,593 | B2 | 6/2004 | Mori et al. |
| 6,762,684 | B1 | 7/2004 | Camhi |
| 6,765,495 | B1 | 7/2004 | Dunning et al. |
| 6,778,888 | B2 | 8/2004 | Cataldo et al. |
| 6,782,240 | B1 | 8/2004 | Tabe |
| 6,785,531 | B2 | 8/2004 | Lepley et al. |
| 6,816,783 | B2 | 11/2004 | Hashima et al. |
| 6,820,259 | B1 | 11/2004 | Kawamata et al. |
| 6,944,533 | B2 | 9/2005 | Obradovich et al. |
| 6,950,022 | B2 | 9/2005 | Breed |
| 6,958,707 | B1 | 10/2005 | Siegel |
| 6,992,580 | B2 | 1/2006 | Kotzin et al. |
| 7,019,641 | B1 | 3/2006 | Lakshmanan et al. |
| 7,020,544 | B2 | 3/2006 | Shinada et al. |
| 7,021,691 | B1 | 4/2006 | Schmidt et al. |
| 7,042,345 | B2 | 5/2006 | Ellis |
| 7,047,129 | B2 | 5/2006 | Uotani |
| 7,058,898 | B2 | 6/2006 | McWalter et al. |
| 7,096,431 | B2 | 8/2006 | Tambata et al. |
| 7,142,696 | B1 | 11/2006 | Engelsberg et al. |
| 7,164,117 | B2 | 1/2007 | Breed et al. |
| 7,187,947 | B1 | 3/2007 | White et al. |
| 7,203,598 | B1 | 4/2007 | Whitsell |
| 7,233,861 | B2 | 6/2007 | Van Buer et al. |
| 7,239,960 | B2 | 7/2007 | Yokota et al. |
| 7,277,454 | B2 | 10/2007 | Mocek et al. |
| 7,284,769 | B2 | 10/2007 | Breed |
| 7,289,645 | B2 | 10/2007 | Yamamoto et al. |
| 7,295,921 | B2 | 11/2007 | Spencer et al. |
| 7,313,547 | B2 | 12/2007 | Mocek et al. |
| 7,333,012 | B1 | 2/2008 | Nguyen |
| 7,343,148 | B1 | 3/2008 | O'Neil |
| 7,386,376 | B2 | 6/2008 | Basir et al. |
| 7,386,799 | B1 | 6/2008 | Clanton et al. |
| 7,432,829 | B2 | 10/2008 | Poltorak |
| 7,474,264 | B2 | 1/2009 | Bolduc et al. |
| 7,493,140 | B2 | 2/2009 | Michmerhuizen et al. |
| 7,526,539 | B1 | 4/2009 | Hsu |
| 7,548,815 | B2 | 6/2009 | Watkins et al. |
| 7,566,083 | B2 | 7/2009 | Vitito |
| 7,606,660 | B2 | 10/2009 | Diaz et al. |
| 7,606,867 | B1 | 10/2009 | Singhal et al. |
| 7,643,913 | B2 | 1/2010 | Taki et al. |
| 7,650,234 | B2 | 1/2010 | Obradovich et al. |
| 7,671,764 | B2 | 3/2010 | Uyeki et al. |
| 7,680,596 | B2 | 3/2010 | Uyeki et al. |
| 7,683,771 | B1 | 3/2010 | Loeb |
| 7,711,468 | B1 | 5/2010 | Levy |
| 7,734,315 | B2 | 6/2010 | Rathus et al. |
| 7,748,021 | B2 | 6/2010 | Obradovich et al. |
| RE41,449 | E | 7/2010 | Krahnstoever et al. |
| 7,791,499 | B2 | 9/2010 | Mohan et al. |
| 7,796,190 | B2 | 9/2010 | Basso et al. |
| 7,802,832 | B2 | 9/2010 | Carnevali |
| 7,821,421 | B2 | 10/2010 | Tamir et al. |
| 7,832,762 | B2 | 11/2010 | Breed |
| 7,864,073 | B2 | 1/2011 | Lee et al. |
| 7,872,591 | B2 | 1/2011 | Kane et al. |
| 7,873,471 | B2 | 1/2011 | Gieseke |
| 7,881,703 | B2 | 2/2011 | Roundtree et al. |
| 7,891,004 | B1 | 2/2011 | Gelvin et al. |
| 7,891,719 | B2 | 2/2011 | Carnevali |
| 7,899,610 | B2 | 3/2011 | McClellan |
| 7,966,678 | B2 | 6/2011 | Ten Eyck et al. |
| 7,969,290 | B2 | 6/2011 | Waeller et al. |
| 7,969,324 | B2 | 6/2011 | Chevion et al. |
| 8,060,631 | B2 | 11/2011 | Collart et al. |
| 8,064,925 | B1 | 11/2011 | Sun et al. |
| 8,066,313 | B2 | 11/2011 | Carnevali |
| 8,098,170 | B1 | 1/2012 | Szczerba et al. |
| 8,113,564 | B2 | 2/2012 | Carnevali |
| 8,131,419 | B2 | 3/2012 | Ampunan et al. |
| 8,157,310 | B2 | 4/2012 | Carnevali |
| 8,162,368 | B2 | 4/2012 | Carnevali |
| 8,175,802 | B2 | 5/2012 | Forstall et al. |
| 8,233,919 | B2 | 7/2012 | Haag et al. |
| 8,245,609 | B1 | 8/2012 | Greenwald et al. |
| 8,306,514 | B1 | 11/2012 | Nunally |
| 8,334,847 | B2 | 12/2012 | Tomkins |
| 8,346,233 | B2 | 1/2013 | Aaron et al. |
| 8,346,432 | B2 | 1/2013 | Van Wiemeersch et al. |
| 8,350,721 | B2 | 1/2013 | Can |

(56) References Cited

U.S. PATENT DOCUMENTS

| | | |
|---|---|---|
| 8,352,282 B2 | 1/2013 | Jensen et al. |
| 8,355,839 B2 | 1/2013 | Schofield et al. |
| 8,369,263 B2 | 2/2013 | Dowling et al. |
| 8,417,449 B1 | 4/2013 | Denise |
| 8,432,260 B2 | 4/2013 | Talty et al. |
| 8,442,389 B2 | 5/2013 | Kashima et al. |
| 8,442,758 B1 | 5/2013 | Rovik et al. |
| 8,467,965 B2 | 6/2013 | Chang |
| 8,497,842 B2 | 7/2013 | Tomkins et al. |
| 8,498,809 B2 | 7/2013 | Bill |
| 8,509,982 B2 | 8/2013 | Montemerlo et al. |
| 8,521,410 B2 | 8/2013 | Mizuno et al. |
| 8,527,143 B2 | 9/2013 | Tan |
| 8,527,146 B1 | 9/2013 | Jackson et al. |
| 8,532,574 B2 | 9/2013 | Kirsch |
| 8,543,330 B2 | 9/2013 | Taylor et al. |
| 8,547,340 B2 | 10/2013 | Sizelove et al. |
| 8,548,669 B2 | 10/2013 | Naylor |
| 8,559,183 B1 | 10/2013 | Davis |
| 8,577,600 B1 | 11/2013 | Pierfelice |
| 8,578,279 B2 | 11/2013 | Chen et al. |
| 8,583,292 B2 | 11/2013 | Preston et al. |
| 8,589,073 B2 | 11/2013 | Guha et al. |
| 8,600,611 B2 | 12/2013 | Seize |
| 8,613,385 B1 | 12/2013 | Hulet et al. |
| 8,621,645 B1 | 12/2013 | Spackman |
| 8,624,727 B2 | 1/2014 | Saigh et al. |
| 8,634,984 B2 | 1/2014 | Sumizawa |
| 8,644,165 B2 | 2/2014 | Saarimaki et al. |
| 8,660,735 B2 | 2/2014 | Tengler et al. |
| 8,671,068 B2 | 3/2014 | Harter et al. |
| 8,688,372 B2 | 4/2014 | Bhogal et al. |
| 8,705,527 B1 | 4/2014 | Addepalli et al. |
| 8,706,143 B1 | 4/2014 | Elias |
| 8,718,797 B1 | 5/2014 | Addepalli et al. |
| 8,725,311 B1 | 5/2014 | Breed |
| 8,730,033 B2 | 5/2014 | Yarnold et al. |
| 8,737,986 B2 | 5/2014 | Rhoads et al. |
| 8,761,673 B2 | 6/2014 | Sakata |
| 8,774,842 B2 | 7/2014 | Jones et al. |
| 8,779,947 B2 | 7/2014 | Tengler et al. |
| 8,782,262 B2 | 7/2014 | Collart et al. |
| 8,793,065 B2 | 7/2014 | Seltzer et al. |
| 8,798,918 B2 | 8/2014 | Onishi et al. |
| 8,805,110 B2 | 8/2014 | Rhoads et al. |
| 8,812,171 B2 | 8/2014 | Fillev et al. |
| 8,817,761 B2 | 8/2014 | Gruberman et al. |
| 8,825,031 B2 | 9/2014 | Aaron et al. |
| 8,825,277 B2 | 9/2014 | McClellan et al. |
| 8,825,382 B2 | 9/2014 | Liu |
| 8,826,261 B1 | 9/2014 | Anand et al. |
| 8,838,088 B1 | 9/2014 | Henn et al. |
| 8,862,317 B2 | 10/2014 | Shin et al. |
| 8,977,408 B1 | 3/2015 | Cazanas et al. |
| 9,043,016 B2 | 5/2015 | Filippov et al. |
| 9,229,905 B1 | 1/2016 | Penilla et al. |
| 2001/0010516 A1 | 8/2001 | Roh et al. |
| 2001/0015888 A1 | 8/2001 | Shaler et al. |
| 2002/0009978 A1 | 1/2002 | Dukach et al. |
| 2002/0023010 A1 | 2/2002 | Rittmaster et al. |
| 2002/0026278 A1 | 2/2002 | Feldman et al. |
| 2002/0045484 A1 | 4/2002 | Eck et al. |
| 2002/0065046 A1 | 5/2002 | Mankins et al. |
| 2002/0077985 A1 | 6/2002 | Kobata et al. |
| 2002/0095249 A1 | 7/2002 | Lang |
| 2002/0097145 A1 | 7/2002 | Tumey et al. |
| 2002/0103622 A1 | 8/2002 | Burge |
| 2002/0105968 A1 | 8/2002 | Pruzan et al. |
| 2002/0126876 A1 | 9/2002 | Paul et al. |
| 2002/0128774 A1 | 9/2002 | Takezaki et al. |
| 2002/0143461 A1 | 10/2002 | Burns et al. |
| 2002/0143643 A1 | 10/2002 | Catan |
| 2002/0152010 A1 | 10/2002 | Colmenarez et al. |
| 2002/0154217 A1 | 10/2002 | Ikeda |
| 2002/0169551 A1 | 11/2002 | Inoue et al. |
| 2002/0174021 A1 | 11/2002 | Chu et al. |
| 2003/0004624 A1 | 1/2003 | Wilson et al. |
| 2003/0007227 A1 | 1/2003 | Ogino |
| 2003/0055557 A1 | 3/2003 | Dutta et al. |
| 2003/0060937 A1 | 3/2003 | Shinada et al. |
| 2003/0065432 A1 | 4/2003 | Shuman et al. |
| 2003/0101451 A1 | 5/2003 | Bentolila et al. |
| 2003/0109972 A1 | 6/2003 | Tak |
| 2003/0125846 A1 | 7/2003 | Yu et al. |
| 2003/0132666 A1 | 7/2003 | Bond et al. |
| 2003/0149530 A1 | 8/2003 | Stopczynski |
| 2003/0158638 A1 | 8/2003 | Yakes et al. |
| 2003/0182435 A1 | 9/2003 | Redlich et al. |
| 2003/0202683 A1 | 10/2003 | Ma et al. |
| 2003/0204290 A1 | 10/2003 | Sadler et al. |
| 2003/0230443 A1 | 12/2003 | Cramer et al. |
| 2004/0008253 A1* | 1/2004 | Monroe ........... G08B 13/19641 348/143 |
| 2004/0017292 A1 | 1/2004 | Reese et al. |
| 2004/0024502 A1 | 2/2004 | Squires et al. |
| 2004/0036622 A1 | 2/2004 | Dukach et al. |
| 2004/0039500 A1 | 2/2004 | Amendola et al. |
| 2004/0039504 A1 | 2/2004 | Coffee et al. |
| 2004/0068364 A1 | 4/2004 | Zhao et al. |
| 2004/0070920 A1 | 4/2004 | Flueli |
| 2004/0093155 A1 | 5/2004 | Simonds et al. |
| 2004/0117494 A1 | 6/2004 | Mitchell et al. |
| 2004/0128062 A1 | 7/2004 | Ogino et al. |
| 2004/0153356 A1 | 8/2004 | Lockwood et al. |
| 2004/0162019 A1 | 8/2004 | Horita et al. |
| 2004/0180653 A1 | 9/2004 | Royalty |
| 2004/0182574 A1 | 9/2004 | Adnan et al. |
| 2004/0193347 A1 | 9/2004 | Harumoto et al. |
| 2004/0203974 A1 | 10/2004 | Seibel |
| 2004/0204837 A1 | 10/2004 | Singleton |
| 2004/0209594 A1 | 10/2004 | Naboulsi |
| 2004/0217850 A1 | 11/2004 | Perttunen et al. |
| 2004/0225557 A1 | 11/2004 | Phelan et al. |
| 2004/0255123 A1 | 12/2004 | Noyama et al. |
| 2004/0257208 A1 | 12/2004 | Huang et al. |
| 2004/0260470 A1 | 12/2004 | Rast |
| 2005/0012599 A1 | 1/2005 | DeMatteo |
| 2005/0031100 A1 | 2/2005 | Iggulden et al. |
| 2005/0038598 A1 | 2/2005 | Oesterling et al. |
| 2005/0042999 A1 | 2/2005 | Rappaport |
| 2005/0065678 A1 | 3/2005 | Smith et al. |
| 2005/0065711 A1 | 3/2005 | Dahlgren et al. |
| 2005/0086051 A1 | 4/2005 | Brulle-Drews |
| 2005/0093717 A1 | 5/2005 | Lilja |
| 2005/0097541 A1 | 5/2005 | Holland |
| 2005/0114864 A1 | 5/2005 | Surace |
| 2005/0122235 A1 | 6/2005 | Teffer et al. |
| 2005/0124211 A1 | 6/2005 | Diessner et al. |
| 2005/0130744 A1 | 6/2005 | Eck et al. |
| 2005/0144156 A1 | 6/2005 | Barber |
| 2005/0149752 A1 | 7/2005 | Johnson et al. |
| 2005/0153760 A1 | 7/2005 | Varley |
| 2005/0159853 A1 | 7/2005 | Takahashi et al. |
| 2005/0159892 A1 | 7/2005 | Chung |
| 2005/0192727 A1 | 9/2005 | Shostak et al. |
| 2005/0197748 A1 | 9/2005 | Holst et al. |
| 2005/0197767 A1 | 9/2005 | Nortrup |
| 2005/0251324 A1 | 11/2005 | Wiener et al. |
| 2005/0261815 A1 | 11/2005 | Cowelchuk et al. |
| 2005/0278093 A1 | 12/2005 | Kameyama |
| 2005/0283284 A1 | 12/2005 | Grenier et al. |
| 2006/0015819 A1 | 1/2006 | Hawkins et al. |
| 2006/0036358 A1 | 2/2006 | Hale et al. |
| 2006/0044119 A1 | 3/2006 | Egelhaaf |
| 2006/0047386 A1 | 3/2006 | Kanevsky et al. |
| 2006/0058948 A1 | 3/2006 | Blass et al. |
| 2006/0059229 A1 | 3/2006 | Bain et al. |
| 2006/0125631 A1 | 6/2006 | Sharony |
| 2006/0130033 A1 | 6/2006 | Stoffels et al. |
| 2006/0142933 A1 | 6/2006 | Feng |
| 2006/0173841 A1 | 8/2006 | Bill |
| 2006/0175403 A1 | 8/2006 | McConnell et al. |
| 2006/0184319 A1 | 8/2006 | Seick et al. |
| 2006/0212909 A1 | 9/2006 | Girard et al. |

(56) References Cited

U.S. PATENT DOCUMENTS

| | | |
|---|---|---|
| 2006/0241836 A1 | 10/2006 | Kachouh et al. |
| 2006/0243056 A1 | 11/2006 | Sundermeyer et al. |
| 2006/0250272 A1 | 11/2006 | Puamau |
| 2006/0253307 A1 | 11/2006 | Warren et al. |
| 2006/0259210 A1 | 11/2006 | Tanaka et al. |
| 2006/0274829 A1 | 12/2006 | Siemens et al. |
| 2006/0282204 A1 | 12/2006 | Breed |
| 2006/0287807 A1 | 12/2006 | Teffer |
| 2006/0287865 A1 | 12/2006 | Cross et al. |
| 2006/0288382 A1 | 12/2006 | Vitito |
| 2006/0290516 A1 | 12/2006 | Muehlsteff et al. |
| 2007/0001831 A1 | 1/2007 | Raz et al. |
| 2007/0002032 A1 | 1/2007 | Powers et al. |
| 2007/0010942 A1 | 1/2007 | Bill |
| 2007/0015485 A1 | 1/2007 | DeBiasio et al. |
| 2007/0028370 A1 | 2/2007 | Seng |
| 2007/0032225 A1 | 2/2007 | Konicek et al. |
| 2007/0057781 A1 | 3/2007 | Breed |
| 2007/0061057 A1 | 3/2007 | Huang et al. |
| 2007/0067614 A1 | 3/2007 | Berry et al. |
| 2007/0069880 A1 | 3/2007 | Best et al. |
| 2007/0083298 A1 | 4/2007 | Pierce et al. |
| 2007/0088488 A1 | 4/2007 | Reeves et al. |
| 2007/0103328 A1 | 5/2007 | Lakshmanan et al. |
| 2007/0115101 A1 | 5/2007 | Creekbaum et al. |
| 2007/0118301 A1 | 5/2007 | Andarawis et al. |
| 2007/0120697 A1 | 5/2007 | Ayoub et al. |
| 2007/0135995 A1 | 6/2007 | Kikuchi et al. |
| 2007/0139182 A1 | 6/2007 | O'Connor et al. |
| 2007/0156317 A1 | 7/2007 | Breed |
| 2007/0182625 A1 | 8/2007 | Kerai et al. |
| 2007/0182816 A1 | 8/2007 | Fox |
| 2007/0185969 A1 | 8/2007 | Davis |
| 2007/0192486 A1 | 8/2007 | Wilson et al. |
| 2007/0194902 A1 | 8/2007 | Blanco et al. |
| 2007/0194944 A1 | 8/2007 | Galera et al. |
| 2007/0195997 A1 | 8/2007 | Paul et al. |
| 2007/0200663 A1 | 8/2007 | White et al. |
| 2007/0208860 A1 | 9/2007 | Zellner et al. |
| 2007/0213090 A1 | 9/2007 | Holmberg |
| 2007/0228826 A1 | 10/2007 | Jordan et al. |
| 2007/0233341 A1 | 10/2007 | Logsdon |
| 2007/0250228 A1 | 10/2007 | Reddy et al. |
| 2007/0257815 A1 | 11/2007 | Gunderson et al. |
| 2007/0276596 A1 | 11/2007 | Solomon et al. |
| 2007/0280505 A1 | 12/2007 | Breed |
| 2008/0005974 A1 | 1/2008 | Delgado Vazquez et al. |
| 2008/0023253 A1 | 1/2008 | Prost-Fin et al. |
| 2008/0027337 A1 | 1/2008 | Dugan et al. |
| 2008/0033635 A1 | 2/2008 | Obradovich et al. |
| 2008/0042824 A1 | 2/2008 | Kates |
| 2008/0051957 A1 | 2/2008 | Breed et al. |
| 2008/0052627 A1 | 2/2008 | Oguchi |
| 2008/0071465 A1 | 3/2008 | Chapman et al. |
| 2008/0082237 A1 | 4/2008 | Breed |
| 2008/0086455 A1 | 4/2008 | Meisels et al. |
| 2008/0090522 A1 | 4/2008 | Oyama |
| 2008/0097699 A1 | 4/2008 | Ono |
| 2008/0104227 A1 | 5/2008 | Birnie et al. |
| 2008/0119994 A1 | 5/2008 | Kameyama |
| 2008/0129475 A1 | 6/2008 | Breed et al. |
| 2008/0143085 A1 | 6/2008 | Breed et al. |
| 2008/0147280 A1 | 6/2008 | Breed |
| 2008/0148374 A1 | 6/2008 | Spaur et al. |
| 2008/0154712 A1 | 6/2008 | Wellman |
| 2008/0154957 A1 | 6/2008 | Taylor et al. |
| 2008/0161986 A1 | 7/2008 | Breed |
| 2008/0164985 A1 | 7/2008 | Iketani et al. |
| 2008/0169940 A1 | 7/2008 | Lee et al. |
| 2008/0174451 A1 | 7/2008 | Harrington et al. |
| 2008/0212215 A1 | 9/2008 | Schofield et al. |
| 2008/0216067 A1 | 9/2008 | Villing |
| 2008/0228358 A1 | 9/2008 | Wang et al. |
| 2008/0234919 A1 | 9/2008 | Ritter et al. |
| 2008/0252487 A1 | 10/2008 | McClellan et al. |
| 2008/0253613 A1 | 10/2008 | Jones et al. |
| 2008/0255721 A1 | 10/2008 | Yamada |
| 2008/0255722 A1 | 10/2008 | McClellan et al. |
| 2008/0269958 A1 | 10/2008 | Filev et al. |
| 2008/0281508 A1 | 11/2008 | Fu |
| 2008/0300778 A1 | 12/2008 | Kuznetsov |
| 2008/0305780 A1 | 12/2008 | Williams et al. |
| 2008/0319602 A1 | 12/2008 | McClellan et al. |
| 2009/0006525 A1 | 1/2009 | Moore |
| 2009/0024419 A1 | 1/2009 | McClellan et al. |
| 2009/0037719 A1 | 2/2009 | Sakthikumar et al. |
| 2009/0040026 A1 | 2/2009 | Tanaka |
| 2009/0055178 A1 | 2/2009 | Coon |
| 2009/0082951 A1 | 3/2009 | Graessley |
| 2009/0099720 A1 | 4/2009 | Elgali |
| 2009/0112393 A1 | 4/2009 | Maten et al. |
| 2009/0112452 A1 | 4/2009 | Buck et al. |
| 2009/0119657 A1 | 5/2009 | Link, II |
| 2009/0125174 A1 | 5/2009 | Delean |
| 2009/0132294 A1 | 5/2009 | Haines |
| 2009/0138336 A1 | 5/2009 | Ashley et al. |
| 2009/0144622 A1 | 6/2009 | Evans et al. |
| 2009/0157312 A1 | 6/2009 | Black et al. |
| 2009/0158200 A1 | 6/2009 | Palahnuk et al. |
| 2009/0180668 A1 | 7/2009 | Jones et al. |
| 2009/0189373 A1 | 7/2009 | Schramm et al. |
| 2009/0189979 A1 | 7/2009 | Smyth |
| 2009/0195370 A1 | 8/2009 | Huffman et al. |
| 2009/0210257 A1 | 8/2009 | Chalfant et al. |
| 2009/0216935 A1 | 8/2009 | Flick |
| 2009/0222200 A1 | 9/2009 | Link et al. |
| 2009/0224931 A1 | 9/2009 | Dietz et al. |
| 2009/0224942 A1 | 9/2009 | Goudy et al. |
| 2009/0234578 A1 | 9/2009 | Newby et al. |
| 2009/0241883 A1 | 10/2009 | Nagoshi et al. |
| 2009/0254446 A1 | 10/2009 | Chernyak |
| 2009/0264849 A1 | 10/2009 | La Croix |
| 2009/0275321 A1 | 11/2009 | Crowe |
| 2009/0278750 A1 | 11/2009 | Man et al. |
| 2009/0278915 A1 | 11/2009 | Kramer et al. |
| 2009/0278938 A1* | 11/2009 | Shulman ............... G01C 11/00 348/169 |
| 2009/0279839 A1 | 11/2009 | Nakamura et al. |
| 2009/0284359 A1 | 11/2009 | Huang et al. |
| 2009/0287405 A1 | 11/2009 | Liu et al. |
| 2009/0299572 A1 | 12/2009 | Fujikawa et al. |
| 2009/0312998 A1 | 12/2009 | Berckmans et al. |
| 2009/0319181 A1 | 12/2009 | Khosravy et al. |
| 2010/0008053 A1 | 1/2010 | Osternack et al. |
| 2010/0023204 A1 | 1/2010 | Basir et al. |
| 2010/0035620 A1 | 2/2010 | Naden et al. |
| 2010/0036560 A1 | 2/2010 | Wright et al. |
| 2010/0042498 A1 | 2/2010 | Schalk |
| 2010/0052945 A1 | 3/2010 | Breed |
| 2010/0057337 A1 | 3/2010 | Fuchs |
| 2010/0066498 A1 | 3/2010 | Fenton |
| 2010/0069115 A1 | 3/2010 | Liu |
| 2010/0070338 A1 | 3/2010 | Siotia et al. |
| 2010/0077094 A1 | 3/2010 | Howarter et al. |
| 2010/0087987 A1 | 4/2010 | Huang et al. |
| 2010/0090817 A1 | 4/2010 | Yamaguchi et al. |
| 2010/0097178 A1 | 4/2010 | Pisz et al. |
| 2010/0097239 A1 | 4/2010 | Campbell et al. |
| 2010/0097458 A1 | 4/2010 | Zhang et al. |
| 2010/0106344 A1 | 4/2010 | Edwards et al. |
| 2010/0106418 A1 | 4/2010 | Kindo et al. |
| 2010/0118025 A1 | 5/2010 | Smith et al. |
| 2010/0121570 A1 | 5/2010 | Tokue et al. |
| 2010/0121645 A1 | 5/2010 | Seitz et al. |
| 2010/0125387 A1 | 5/2010 | Sehyun et al. |
| 2010/0125405 A1 | 5/2010 | Chae et al. |
| 2010/0125811 A1 | 5/2010 | Moore et al. |
| 2010/0127847 A1 | 5/2010 | Evans et al. |
| 2010/0131300 A1 | 5/2010 | Collopy et al. |
| 2010/0134958 A1 | 6/2010 | Disaverio et al. |
| 2010/0136944 A1 | 6/2010 | Taylor et al. |
| 2010/0137037 A1 | 6/2010 | Basir |
| 2010/0144284 A1 | 6/2010 | Chutorash et al. |
| 2010/0145700 A1 | 6/2010 | Kennewick et al. |

(56) References Cited

U.S. PATENT DOCUMENTS

| | | |
|---|---|---|
| 2010/0145987 A1 | 6/2010 | Haver et al. |
| 2010/0152976 A1 | 6/2010 | White et al. |
| 2010/0169432 A1 | 7/2010 | Santori et al. |
| 2010/0174474 A1 | 7/2010 | Nagase |
| 2010/0179712 A1 | 7/2010 | Pepitone et al. |
| 2010/0185341 A1 | 7/2010 | Wilson et al. |
| 2010/0188831 A1 | 7/2010 | Ortel |
| 2010/0197359 A1 | 8/2010 | Harris |
| 2010/0202346 A1 | 8/2010 | Sitzes et al. |
| 2010/0211259 A1 | 8/2010 | McClellan |
| 2010/0211282 A1 | 8/2010 | Nakata et al. |
| 2010/0211300 A1 | 8/2010 | Jaffe et al. |
| 2010/0211304 A1 | 8/2010 | Hwang et al. |
| 2010/0211441 A1 | 8/2010 | Sprigg et al. |
| 2010/0217458 A1 | 8/2010 | Schweiger et al. |
| 2010/0222939 A1 | 9/2010 | Namburu et al. |
| 2010/0228404 A1 | 9/2010 | Link et al. |
| 2010/0234071 A1 | 9/2010 | Shabtay et al. |
| 2010/0235042 A1 | 9/2010 | Ying |
| 2010/0235744 A1 | 9/2010 | Schultz |
| 2010/0235891 A1 | 9/2010 | Oglesbee et al. |
| 2010/0250071 A1 | 9/2010 | Pala et al. |
| 2010/0253493 A1 | 10/2010 | Szczerba et al. |
| 2010/0256836 A1 | 10/2010 | Mudalige |
| 2010/0265104 A1 | 10/2010 | Zlojutro |
| 2010/0268426 A1 | 10/2010 | Pathak et al. |
| 2010/0274410 A1 | 10/2010 | Tsien et al. |
| 2010/0280751 A1 | 11/2010 | Breed |
| 2010/0287303 A1 | 11/2010 | Smith et al. |
| 2010/0289632 A1 | 11/2010 | Seder et al. |
| 2010/0289643 A1 | 11/2010 | Trundle et al. |
| 2010/0291427 A1 | 11/2010 | Zhou |
| 2010/0295676 A1 | 11/2010 | Khachaturov et al. |
| 2010/0304640 A1 | 12/2010 | Sofman et al. |
| 2010/0305807 A1 | 12/2010 | Basir et al. |
| 2010/0306080 A1 | 12/2010 | Trandal et al. |
| 2010/0306309 A1 | 12/2010 | Santori et al. |
| 2010/0306435 A1 | 12/2010 | Nigoghosian et al. |
| 2010/0315218 A1 | 12/2010 | Cades et al. |
| 2010/0321151 A1 | 12/2010 | Matsuura et al. |
| 2010/0325626 A1 | 12/2010 | Greschler et al. |
| 2010/0332130 A1 | 12/2010 | Shimizu et al. |
| 2011/0015853 A1 | 1/2011 | DeKock et al. |
| 2011/0018736 A1 | 1/2011 | Carr |
| 2011/0021213 A1 | 1/2011 | Carr |
| 2011/0021234 A1 | 1/2011 | Tibbits et al. |
| 2011/0028138 A1 | 2/2011 | Davies-Moore et al. |
| 2011/0035098 A1 | 2/2011 | Goto et al. |
| 2011/0035141 A1 | 2/2011 | Barker et al. |
| 2011/0040438 A1 | 2/2011 | Kluge et al. |
| 2011/0050589 A1 | 3/2011 | Yan et al. |
| 2011/0053506 A1 | 3/2011 | Lemke et al. |
| 2011/0077808 A1 | 3/2011 | Hyde et al. |
| 2011/0078024 A1 | 3/2011 | Messier et al. |
| 2011/0080282 A1 | 4/2011 | Kleve et al. |
| 2011/0082615 A1 | 4/2011 | Small et al. |
| 2011/0084824 A1 | 4/2011 | Tewari et al. |
| 2011/0090078 A1 | 4/2011 | Kim et al. |
| 2011/0092159 A1 | 4/2011 | Park et al. |
| 2011/0093154 A1 | 4/2011 | Moinzadeh et al. |
| 2011/0093158 A1 | 4/2011 | Theisen et al. |
| 2011/0093438 A1 | 4/2011 | Poulsen |
| 2011/0093846 A1 | 4/2011 | Moinzadeh et al. |
| 2011/0105097 A1 | 5/2011 | Tadayon et al. |
| 2011/0106375 A1 | 5/2011 | Sundaram et al. |
| 2011/0112717 A1 | 5/2011 | Resner |
| 2011/0112969 A1 | 5/2011 | Zaid et al. |
| 2011/0117933 A1 | 5/2011 | Andersson |
| 2011/0119344 A1 | 5/2011 | Eustis |
| 2011/0130915 A1 | 6/2011 | Wright et al. |
| 2011/0134749 A1 | 6/2011 | Speks et al. |
| 2011/0137520 A1 | 6/2011 | Rector et al. |
| 2011/0145331 A1 | 6/2011 | Christie et al. |
| 2011/0172873 A1 | 7/2011 | Szwabowski et al. |
| 2011/0175754 A1 | 7/2011 | Karpinsky |
| 2011/0183658 A1 | 7/2011 | Zellner |
| 2011/0187520 A1 | 8/2011 | Filev et al. |
| 2011/0193707 A1 | 8/2011 | Ngo |
| 2011/0193726 A1 | 8/2011 | Szwabowski et al. |
| 2011/0195699 A1 | 8/2011 | Tadayon et al. |
| 2011/0197187 A1 | 8/2011 | Roh |
| 2011/0205047 A1 | 8/2011 | Patel et al. |
| 2011/0209079 A1 | 8/2011 | Tarte et al. |
| 2011/0210867 A1 | 9/2011 | Benedikt |
| 2011/0212717 A1 | 9/2011 | Rhoads et al. |
| 2011/0221656 A1 | 9/2011 | Haddick et al. |
| 2011/0224865 A1 | 9/2011 | Gordon et al. |
| 2011/0224898 A1 | 9/2011 | Scofield et al. |
| 2011/0225527 A1 | 9/2011 | Law et al. |
| 2011/0227757 A1 | 9/2011 | Chen et al. |
| 2011/0231091 A1 | 9/2011 | Gourlay et al. |
| 2011/0234369 A1 | 9/2011 | Cai et al. |
| 2011/0245999 A1 | 10/2011 | Kordonowy |
| 2011/0246210 A1 | 10/2011 | Matsur |
| 2011/0247013 A1 | 10/2011 | Feller et al. |
| 2011/0251734 A1 | 10/2011 | Schepp et al. |
| 2011/0257973 A1 | 10/2011 | Chutorash et al. |
| 2011/0267204 A1 | 11/2011 | Chuang et al. |
| 2011/0267205 A1 | 11/2011 | McClellan et al. |
| 2011/0286676 A1 | 11/2011 | El Dokor |
| 2011/0291886 A1 | 12/2011 | Krieter |
| 2011/0291926 A1 | 12/2011 | Gokturk et al. |
| 2011/0298808 A1 | 12/2011 | Rovik |
| 2011/0301844 A1 | 12/2011 | Aono |
| 2011/0307354 A1 | 12/2011 | Erman et al. |
| 2011/0307570 A1 | 12/2011 | Speks |
| 2011/0309926 A1 | 12/2011 | Eikelenberg et al. |
| 2011/0309953 A1 | 12/2011 | Petite et al. |
| 2011/0313653 A1 | 12/2011 | Lindner |
| 2011/0320089 A1 | 12/2011 | Lewis |
| 2012/0006610 A1 | 1/2012 | Wallace et al. |
| 2012/0010807 A1 | 1/2012 | Zhou |
| 2012/0016581 A1 | 1/2012 | Mochizuki et al. |
| 2012/0028599 A1 | 2/2012 | Hatton et al. |
| 2012/0029852 A1 | 2/2012 | Goff et al. |
| 2012/0030002 A1 | 2/2012 | Bous et al. |
| 2012/0030512 A1 | 2/2012 | Wadhwa et al. |
| 2012/0038489 A1 | 2/2012 | Goldshmidt |
| 2012/0046822 A1 | 2/2012 | Anderson |
| 2012/0047530 A1 | 2/2012 | Shkedi |
| 2012/0053793 A1 | 3/2012 | Sala et al. |
| 2012/0053888 A1 | 3/2012 | Stahlin et al. |
| 2012/0059789 A1 | 3/2012 | Sakai et al. |
| 2012/0065815 A1 | 3/2012 | Hess |
| 2012/0065834 A1 | 3/2012 | Senart |
| 2012/0068956 A1 | 3/2012 | Jira et al. |
| 2012/0071097 A1 | 3/2012 | Matsushita et al. |
| 2012/0072244 A1 | 3/2012 | Collins et al. |
| 2012/0074770 A1 | 3/2012 | Lee |
| 2012/0083960 A1* | 4/2012 | Zhu ..................... G06T 7/223 701/23 |
| 2012/0083971 A1 | 4/2012 | Preston |
| 2012/0084773 A1 | 4/2012 | Lee et al. |
| 2012/0089299 A1 | 4/2012 | Breed |
| 2012/0092251 A1 | 4/2012 | Hashimoto et al. |
| 2012/0101876 A1 | 4/2012 | Truvey et al. |
| 2012/0101914 A1 | 4/2012 | Kumar et al. |
| 2012/0105613 A1 | 5/2012 | Weng et al. |
| 2012/0106114 A1 | 5/2012 | Caron et al. |
| 2012/0109446 A1 | 5/2012 | Yousefi et al. |
| 2012/0109451 A1 | 5/2012 | Tan |
| 2012/0110356 A1 | 5/2012 | Yousefi et al. |
| 2012/0113822 A1 | 5/2012 | Letner |
| 2012/0115446 A1 | 5/2012 | Guatama et al. |
| 2012/0116609 A1 | 5/2012 | Jung et al. |
| 2012/0116678 A1 | 5/2012 | Witmer |
| 2012/0116696 A1 | 5/2012 | Wank |
| 2012/0136559 A1 | 5/2012 | Rothschild |
| 2012/0146766 A1 | 6/2012 | Geisler et al. |
| 2012/0146809 A1 | 6/2012 | Oh et al. |
| 2012/0149341 A1 | 6/2012 | Tadayon et al. |
| 2012/0150651 A1 | 6/2012 | Hoffberg et al. |
| 2012/0155636 A1 | 6/2012 | Muthaiah |
| 2012/0158436 A1 | 6/2012 | Bauer et al. |

(56) References Cited

U.S. PATENT DOCUMENTS

| | | |
|---|---|---|
| 2012/0173900 A1 | 7/2012 | Diab et al. |
| 2012/0173905 A1 | 7/2012 | Diab et al. |
| 2012/0179325 A1 | 7/2012 | Faenger |
| 2012/0179547 A1 | 7/2012 | Besore et al. |
| 2012/0188876 A1 | 7/2012 | Chow et al. |
| 2012/0197523 A1 | 8/2012 | Kirsch |
| 2012/0197669 A1 | 8/2012 | Kote et al. |
| 2012/0204166 A1 | 8/2012 | Ichihara |
| 2012/0210160 A1 | 8/2012 | Fuhrman |
| 2012/0215375 A1 | 8/2012 | Chang |
| 2012/0217928 A1 | 8/2012 | Kulidjian |
| 2012/0218125 A1 | 8/2012 | Demirdjian et al. |
| 2012/0226413 A1 | 9/2012 | Chen et al. |
| 2012/0238286 A1 | 9/2012 | Mallavarapu et al. |
| 2012/0239242 A1 | 9/2012 | Uehara |
| 2012/0242510 A1 | 9/2012 | Choi et al. |
| 2012/0254763 A1 | 10/2012 | Protopapas et al. |
| 2012/0254804 A1 | 10/2012 | Shema et al. |
| 2012/0259951 A1 | 10/2012 | Schalk et al. |
| 2012/0265359 A1 | 10/2012 | Das |
| 2012/0274459 A1 | 11/2012 | Jaisimha et al. |
| 2012/0274481 A1 | 11/2012 | Ginsberg et al. |
| 2012/0284292 A1 | 11/2012 | Rechsteiner et al. |
| 2012/0289217 A1 | 11/2012 | Reimer et al. |
| 2012/0289253 A1 | 11/2012 | Haag et al. |
| 2012/0296567 A1 | 11/2012 | Breed |
| 2012/0313771 A1 | 12/2012 | Wottlifff, III |
| 2012/0316720 A1 | 12/2012 | Hyde et al. |
| 2012/0317561 A1 | 12/2012 | Aslam et al. |
| 2012/0323413 A1 | 12/2012 | Kedar-Dongarkar et al. |
| 2012/0327231 A1 | 12/2012 | Cochran et al. |
| 2013/0005263 A1 | 1/2013 | Sakata |
| 2013/0005414 A1 | 1/2013 | Bindra et al. |
| 2013/0013157 A1 | 1/2013 | Kim et al. |
| 2013/0019252 A1 | 1/2013 | Haase et al. |
| 2013/0024060 A1 | 1/2013 | Sukkarie et al. |
| 2013/0030645 A1 | 1/2013 | Divine et al. |
| 2013/0030811 A1 | 1/2013 | Olleon et al. |
| 2013/0031540 A1 | 1/2013 | Throop et al. |
| 2013/0031541 A1 | 1/2013 | Wilks et al. |
| 2013/0035063 A1 | 2/2013 | Fisk et al. |
| 2013/0046624 A1 | 2/2013 | Calman |
| 2013/0050069 A1 | 2/2013 | Ota |
| 2013/0055096 A1 | 2/2013 | Kim et al. |
| 2013/0059607 A1 | 3/2013 | Herz et al. |
| 2013/0063336 A1 | 3/2013 | Sugimoto et al. |
| 2013/0066512 A1 | 3/2013 | Willard et al. |
| 2013/0067599 A1 | 3/2013 | Raje et al. |
| 2013/0075530 A1 | 3/2013 | Shander et al. |
| 2013/0079964 A1 | 3/2013 | Sukkarie et al. |
| 2013/0083805 A1 | 4/2013 | Lu et al. |
| 2013/0085787 A1 | 4/2013 | Gore et al. |
| 2013/0086164 A1 | 4/2013 | Wheeler et al. |
| 2013/0099915 A1 | 4/2013 | Prasad et al. |
| 2013/0103196 A1 | 4/2013 | Monceaux et al. |
| 2013/0116882 A1 | 5/2013 | Link et al. |
| 2013/0116915 A1 | 5/2013 | Ferreira et al. |
| 2013/0134730 A1 | 5/2013 | Ricci |
| 2013/0135118 A1 | 5/2013 | Ricci |
| 2013/0138591 A1 | 5/2013 | Ricci |
| 2013/0138714 A1 | 5/2013 | Ricci |
| 2013/0139140 A1 | 5/2013 | Rao et al. |
| 2013/0141247 A1 | 6/2013 | Ricci |
| 2013/0141252 A1 | 6/2013 | Ricci |
| 2013/0143495 A1 | 6/2013 | Ricci |
| 2013/0143546 A1 | 6/2013 | Ricci |
| 2013/0143601 A1 | 6/2013 | Ricci |
| 2013/0144459 A1 | 6/2013 | Ricci |
| 2013/0144460 A1 | 6/2013 | Ricci |
| 2013/0144461 A1 | 6/2013 | Ricci |
| 2013/0144462 A1 | 6/2013 | Ricci |
| 2013/0144463 A1 | 6/2013 | Ricci et al. |
| 2013/0144469 A1 | 6/2013 | Ricci |
| 2013/0144470 A1 | 6/2013 | Ricci |
| 2013/0144474 A1 | 6/2013 | Ricci |
| 2013/0144486 A1 | 6/2013 | Ricci |
| 2013/0144520 A1 | 6/2013 | Ricci |
| 2013/0144657 A1 | 6/2013 | Ricci |
| 2013/0145065 A1 | 6/2013 | Ricci |
| 2013/0145279 A1 | 6/2013 | Ricci |
| 2013/0145297 A1 | 6/2013 | Ricci et al. |
| 2013/0145360 A1 | 6/2013 | Ricci |
| 2013/0145401 A1 | 6/2013 | Ricci |
| 2013/0145482 A1 | 6/2013 | Ricci et al. |
| 2013/0147638 A1 | 6/2013 | Ricci |
| 2013/0151031 A1 | 6/2013 | Ricci |
| 2013/0151065 A1 | 6/2013 | Ricci |
| 2013/0151088 A1 | 6/2013 | Ricci |
| 2013/0151288 A1 | 6/2013 | Bowne et al. |
| 2013/0152003 A1 | 6/2013 | Ricci et al. |
| 2013/0154298 A1 | 6/2013 | Ricci |
| 2013/0157640 A1 | 6/2013 | Aycock |
| 2013/0157647 A1 | 6/2013 | Kolodziej |
| 2013/0158778 A1 | 6/2013 | Tengler et al. |
| 2013/0158821 A1 | 6/2013 | Ricci |
| 2013/0166096 A1 | 6/2013 | Jotanovic |
| 2013/0166097 A1 | 6/2013 | Ricci |
| 2013/0166098 A1 | 6/2013 | Lavie et al. |
| 2013/0166152 A1 | 6/2013 | Butterworth |
| 2013/0166208 A1 | 6/2013 | Forstall et al. |
| 2013/0167159 A1 | 6/2013 | Ricci et al. |
| 2013/0173531 A1 | 7/2013 | Rinearson et al. |
| 2013/0179689 A1 | 7/2013 | Matsumoto et al. |
| 2013/0190978 A1 | 7/2013 | Kato et al. |
| 2013/0194108 A1 | 8/2013 | Lapiotis et al. |
| 2013/0197796 A1 | 8/2013 | Obradovich et al. |
| 2013/0198031 A1 | 8/2013 | Mitchell et al. |
| 2013/0198737 A1 | 8/2013 | Ricci |
| 2013/0198802 A1 | 8/2013 | Ricci |
| 2013/0200991 A1 | 8/2013 | Ricci et al. |
| 2013/0203400 A1 | 8/2013 | Ricci |
| 2013/0204455 A1 | 8/2013 | Chia et al. |
| 2013/0204457 A1 | 8/2013 | King |
| 2013/0204466 A1 | 8/2013 | Ricci |
| 2013/0204484 A1 | 8/2013 | Ricci |
| 2013/0204493 A1 | 8/2013 | Ricci et al. |
| 2013/0204943 A1 | 8/2013 | Ricci |
| 2013/0205026 A1 | 8/2013 | Ricci |
| 2013/0205412 A1 | 8/2013 | Ricci |
| 2013/0207794 A1 | 8/2013 | Patel et al. |
| 2013/0212065 A1 | 8/2013 | Rahnama |
| 2013/0212659 A1 | 8/2013 | Maher et al. |
| 2013/0215116 A1 | 8/2013 | Siddique et al. |
| 2013/0218412 A1 | 8/2013 | Ricci |
| 2013/0218445 A1 | 8/2013 | Basir |
| 2013/0219039 A1 | 8/2013 | Ricci |
| 2013/0226365 A1 | 8/2013 | Brozovich |
| 2013/0226371 A1 | 8/2013 | Rovik et al. |
| 2013/0226392 A1 | 8/2013 | Schneider et al. |
| 2013/0226449 A1 | 8/2013 | Rovik et al. |
| 2013/0226622 A1 | 8/2013 | Adamson et al. |
| 2013/0227648 A1 | 8/2013 | Ricci |
| 2013/0231784 A1 | 9/2013 | Rovik et al. |
| 2013/0231800 A1 | 9/2013 | Ricci |
| 2013/0232142 A1 | 9/2013 | Nielsen et al. |
| 2013/0238165 A1 | 9/2013 | Garrett et al. |
| 2013/0241720 A1 | 9/2013 | Ricci et al. |
| 2013/0245882 A1 | 9/2013 | Ricci |
| 2013/0250933 A1 | 9/2013 | Yousefi et al. |
| 2013/0261871 A1 | 10/2013 | Hobbs et al. |
| 2013/0261966 A1 | 10/2013 | Wang et al. |
| 2013/0265178 A1 | 10/2013 | Tengler et al. |
| 2013/0274997 A1 | 10/2013 | Chien |
| 2013/0279111 A1 | 10/2013 | Lee |
| 2013/0279491 A1 | 10/2013 | Rubin et al. |
| 2013/0282238 A1 | 10/2013 | Ricci et al. |
| 2013/0282357 A1 | 10/2013 | Rubin et al. |
| 2013/0282946 A1 | 10/2013 | Ricci |
| 2013/0288606 A1 | 10/2013 | Kirsch |
| 2013/0293364 A1 | 11/2013 | Ricci et al. |
| 2013/0293452 A1 | 11/2013 | Ricci et al. |
| 2013/0293480 A1 | 11/2013 | Kritt et al. |
| 2013/0295901 A1 | 11/2013 | Abramson et al. |
| 2013/0295908 A1 | 11/2013 | Zeinstra et al. |

(56) References Cited

U.S. PATENT DOCUMENTS

| | | |
|---|---|---|
| 2013/0295913 A1 | 11/2013 | Matthews et al. |
| 2013/0300554 A1 | 11/2013 | Braden |
| 2013/0301584 A1 | 11/2013 | Addepalli et al. |
| 2013/0304371 A1 | 11/2013 | Kitatani et al. |
| 2013/0308265 A1 | 11/2013 | Arnouse |
| 2013/0309977 A1 | 11/2013 | Heines et al. |
| 2013/0311038 A1 | 11/2013 | Kim et al. |
| 2013/0325453 A1 | 12/2013 | Levien et al. |
| 2013/0325568 A1 | 12/2013 | Mangalvedkar et al. |
| 2013/0329372 A1 | 12/2013 | Wilkins |
| 2013/0332023 A1 | 12/2013 | Bertosa et al. |
| 2013/0338914 A1 | 12/2013 | Weiss |
| 2013/0339027 A1 | 12/2013 | Dokor et al. |
| 2013/0345929 A1 | 12/2013 | Bowden et al. |
| 2014/0028542 A1 | 1/2014 | Lovitt et al. |
| 2014/0032014 A1 | 1/2014 | DeBiasio et al. |
| 2014/0046192 A1 | 2/2014 | Mullin et al. |
| 2014/0054957 A1 | 2/2014 | Bellis |
| 2014/0058672 A1 | 2/2014 | Wansley et al. |
| 2014/0066014 A1 | 3/2014 | Nicholson et al. |
| 2014/0067201 A1 | 3/2014 | Visintainer et al. |
| 2014/0067564 A1 | 3/2014 | Yuan |
| 2014/0070917 A1 | 3/2014 | Protopapas |
| 2014/0081544 A1 | 3/2014 | Fry |
| 2014/0088798 A1 | 3/2014 | Himmelstein |
| 2014/0096068 A1 | 4/2014 | Dewan et al. |
| 2014/0097955 A1 | 4/2014 | Lovitt et al. |
| 2014/0109075 A1 | 4/2014 | Hoffman et al. |
| 2014/0109080 A1 | 4/2014 | Ricci |
| 2014/0120829 A1 | 5/2014 | Bhamidipati et al. |
| 2014/0121862 A1 | 5/2014 | Zarrella et al. |
| 2014/0125802 A1 | 5/2014 | Beckert et al. |
| 2014/0143839 A1 | 5/2014 | Ricci |
| 2014/0164611 A1 | 6/2014 | Molettiere et al. |
| 2014/0168062 A1 | 6/2014 | Katz et al. |
| 2014/0168436 A1 | 6/2014 | Pedicino |
| 2014/0169621 A1 | 6/2014 | Burr |
| 2014/0171752 A1 | 6/2014 | Park et al. |
| 2014/0172727 A1 | 6/2014 | Abhyanker et al. |
| 2014/0188533 A1 | 7/2014 | Davidson |
| 2014/0195272 A1 | 7/2014 | Sadiq et al. |
| 2014/0198216 A1 | 7/2014 | Zhai et al. |
| 2014/0200737 A1 | 7/2014 | Lortz et al. |
| 2014/0207328 A1 | 7/2014 | Wolf et al. |
| 2014/0220966 A1 | 8/2014 | Muetzel et al. |
| 2014/0222298 A1 | 8/2014 | Gurin |
| 2014/0223384 A1 | 8/2014 | Graumann |
| 2014/0240089 A1 | 8/2014 | Chang |
| 2014/0244078 A1 | 8/2014 | Downey et al. |
| 2014/0244111 A1 | 8/2014 | Gross et al. |
| 2014/0244156 A1 | 8/2014 | Magnusson et al. |
| 2014/0245277 A1 | 8/2014 | Petro et al. |
| 2014/0245278 A1 | 8/2014 | Zellen |
| 2014/0245284 A1 | 8/2014 | Alrabady et al. |
| 2014/0252091 A1 | 9/2014 | Morse et al. |
| 2014/0257627 A1 | 9/2014 | Hagan, Jr. |
| 2014/0267035 A1 | 9/2014 | Schalk et al. |
| 2014/0277936 A1 | 9/2014 | El Dokor et al. |
| 2014/0278070 A1 | 9/2014 | McGavran et al. |
| 2014/0278071 A1 | 9/2014 | San Filippo et al. |
| 2014/0281971 A1 | 9/2014 | Isbell, III et al. |
| 2014/0282161 A1 | 9/2014 | Cash |
| 2014/0282278 A1 | 9/2014 | Anderson et al. |
| 2014/0282470 A1 | 9/2014 | Buga et al. |
| 2014/0282931 A1 | 9/2014 | Protopapas |
| 2014/0292545 A1 | 10/2014 | Nemoto |
| 2014/0292665 A1 | 10/2014 | Lathrop et al. |
| 2014/0303899 A1 | 10/2014 | Fung |
| 2014/0306799 A1 | 10/2014 | Ricci |
| 2014/0306814 A1 | 10/2014 | Ricci |
| 2014/0306817 A1 | 10/2014 | Ricci |
| 2014/0306826 A1 | 10/2014 | Ricci |
| 2014/0306833 A1 | 10/2014 | Ricci |
| 2014/0306834 A1 | 10/2014 | Ricci |
| 2014/0306835 A1 | 10/2014 | Ricci |
| 2014/0307655 A1 | 10/2014 | Ricci |
| 2014/0307724 A1 | 10/2014 | Ricci |
| 2014/0308902 A1 | 10/2014 | Ricci |
| 2014/0309789 A1 | 10/2014 | Ricci |
| 2014/0309790 A1 | 10/2014 | Ricci |
| 2014/0309804 A1 | 10/2014 | Ricci |
| 2014/0309805 A1 | 10/2014 | Ricci |
| 2014/0309806 A1 | 10/2014 | Ricci |
| 2014/0309813 A1* | 10/2014 | Ricci ............... B60Q 1/00 701/2 |
| 2014/0309814 A1 | 10/2014 | Ricci et al. |
| 2014/0309815 A1 | 10/2014 | Ricci et al. |
| 2014/0309838 A1 | 10/2014 | Ricci |
| 2014/0309839 A1 | 10/2014 | Ricci et al. |
| 2014/0309847 A1 | 10/2014 | Ricci |
| 2014/0309849 A1 | 10/2014 | Ricci |
| 2014/0309852 A1 | 10/2014 | Ricci |
| 2014/0309853 A1 | 10/2014 | Ricci |
| 2014/0309862 A1 | 10/2014 | Ricci |
| 2014/0309863 A1 | 10/2014 | Ricci |
| 2014/0309864 A1 | 10/2014 | Ricci |
| 2014/0309865 A1 | 10/2014 | Ricci |
| 2014/0309866 A1 | 10/2014 | Ricci |
| 2014/0309867 A1 | 10/2014 | Ricci |
| 2014/0309868 A1 | 10/2014 | Ricci |
| 2014/0309869 A1 | 10/2014 | Ricci |
| 2014/0309870 A1 | 10/2014 | Ricci et al. |
| 2014/0309871 A1 | 10/2014 | Ricci |
| 2014/0309872 A1 | 10/2014 | Ricci |
| 2014/0309873 A1 | 10/2014 | Ricci |
| 2014/0309874 A1 | 10/2014 | Ricci |
| 2014/0309875 A1 | 10/2014 | Ricci |
| 2014/0309876 A1 | 10/2014 | Ricci |
| 2014/0309877 A1 | 10/2014 | Ricci |
| 2014/0309878 A1 | 10/2014 | Ricci |
| 2014/0309879 A1 | 10/2014 | Ricci |
| 2014/0309880 A1 | 10/2014 | Ricci |
| 2014/0309885 A1 | 10/2014 | Ricci |
| 2014/0309886 A1 | 10/2014 | Ricci |
| 2014/0309891 A1 | 10/2014 | Ricci |
| 2014/0309892 A1 | 10/2014 | Ricci |
| 2014/0309893 A1 | 10/2014 | Ricci |
| 2014/0309913 A1 | 10/2014 | Ricci et al. |
| 2014/0309919 A1 | 10/2014 | Ricci |
| 2014/0309920 A1 | 10/2014 | Ricci |
| 2014/0309921 A1 | 10/2014 | Ricci et al. |
| 2014/0309922 A1 | 10/2014 | Ricci |
| 2014/0309923 A1 | 10/2014 | Ricci |
| 2014/0309927 A1 | 10/2014 | Ricci |
| 2014/0309929 A1 | 10/2014 | Ricci |
| 2014/0309930 A1 | 10/2014 | Ricci |
| 2014/0309934 A1 | 10/2014 | Ricci |
| 2014/0309935 A1 | 10/2014 | Ricci |
| 2014/0309982 A1 | 10/2014 | Ricci |
| 2014/0310031 A1 | 10/2014 | Ricci |
| 2014/0310075 A1 | 10/2014 | Ricci |
| 2014/0310103 A1 | 10/2014 | Ricci |
| 2014/0310186 A1 | 10/2014 | Ricci |
| 2014/0310277 A1 | 10/2014 | Ricci |
| 2014/0310379 A1 | 10/2014 | Ricci et al. |
| 2014/0310594 A1* | 10/2014 | Ricci et al. |
| 2014/0310610 A1 | 10/2014 | Ricci |
| 2014/0310702 A1 | 10/2014 | Ricci et al. |
| 2014/0310739 A1 | 10/2014 | Ricci et al. |
| 2014/0310788 A1 | 10/2014 | Ricci |
| 2014/0322676 A1 | 10/2014 | Raman |
| 2014/0347207 A1 | 11/2014 | Zeng et al. |
| 2014/0347265 A1 | 11/2014 | Allen et al. |
| 2015/0007155 A1 | 1/2015 | Hoffman et al. |
| 2015/0012186 A1 | 1/2015 | Horseman |
| 2015/0032366 A1 | 1/2015 | Man et al. |
| 2015/0032670 A1 | 1/2015 | Brazell |
| 2015/0057839 A1 | 2/2015 | Chang et al. |
| 2015/0061895 A1 | 3/2015 | Ricci |
| 2015/0081133 A1 | 3/2015 | Schulz |
| 2015/0081167 A1 | 3/2015 | Pisz et al. |
| 2015/0088423 A1 | 3/2015 | Tuukkanen |
| 2015/0088515 A1 | 3/2015 | Beaumont et al. |
| 2015/0116200 A1 | 4/2015 | Kurosawa et al. |

(56) References Cited

U.S. PATENT DOCUMENTS

| | | | |
|---|---|---|---|
| 2015/0158499 | A1 | 6/2015 | Koravadi |
| 2015/0178034 | A1 | 6/2015 | Penilla et al. |
| 2015/0254986 | A1* | 9/2015 | Fairfield .................. G08G 1/22 707/687 |
| 2016/0008985 | A1 | 1/2016 | Kim et al. |
| 2016/0070527 | A1 | 3/2016 | Ricci |
| 2016/0086391 | A1 | 3/2016 | Ricci |
| 2016/0269456 | A1 | 9/2016 | Ricci |
| 2016/0269469 | A1 | 9/2016 | Ricci |
| 2017/0192423 | A1 | 7/2017 | Rust et al. |
| 2017/0268896 | A1* | 9/2017 | Bai .................... G01C 21/36 |
| 2017/0270375 | A1* | 9/2017 | Grauer .................. G01S 17/107 |

FOREIGN PATENT DOCUMENTS

| | | |
|---|---|---|
| CN | 101303878 | 11/2008 |
| CN | 102467827 | 5/2012 |
| EP | 1223567 | 7/2002 |
| EP | 1484729 | 12/2004 |
| EP | 2192015 | 6/2010 |
| JP | 2004-284450 | 10/2004 |
| KR | 2006-0128484 | 12/2006 |
| WO | WO 2007/126204 | 11/2007 |
| WO | WO 2012/102879 | 8/2012 |
| WO | WO 2013/074866 | 5/2013 |
| WO | WO 2013/074867 | 5/2013 |
| WO | WO 2013/074868 | 5/2013 |
| WO | WO 2013/074897 | 5/2013 |
| WO | WO 2013/074899 | 5/2013 |
| WO | WO 2013/074901 | 5/2013 |
| WO | WO 2013/074919 | 5/2013 |
| WO | WO 2013/074981 | 5/2013 |
| WO | WO 2013/074983 | 5/2013 |
| WO | WO 2013/075005 | 5/2013 |
| WO | WO 2013/181310 | 12/2013 |
| WO | WO 2014/014862 | 1/2014 |
| WO | WO 2014/143563 | 9/2014 |
| WO | WO 2014/158667 | 10/2014 |
| WO | WO 2014/158672 | 10/2014 |
| WO | WO 2014/158766 | 10/2014 |
| WO | WO 2014/172312 | 10/2014 |
| WO | WO 2014/172313 | 10/2014 |
| WO | WO 2014/172316 | 10/2014 |
| WO | WO 2014/172320 | 10/2014 |
| WO | WO 2014/172322 | 10/2014 |
| WO | WO 2014/172323 | 10/2014 |
| WO | WO 2014/172327 | 10/2014 |
| WO | WO 2016/145073 | 9/2016 |
| WO | WO 2016/145100 | 9/2016 |

OTHER PUBLICATIONS

Zou et al., "Image Sequences Based Traffic Incident Detection for Signaled Intersections Using HMM", 2009 Ninth International Conference on Hybrid Intelligent Systems (2009): n. pag.
Sharma et al., "Detection of Inclement Weather Conditions at a Signalized Intersection Using a Video Image Processing Algorithm", 2006 IEEE 12th Digital Signal Processing Workshop & 4th IEEE Signal Processing Education Workshop (2006): n. pag.
Ying, "Highway Traffic Automatic Detection System Based on Video and Image Processing", Intelligence Computation and Evolutionary Computation Advances in Intelligent Systems and Computing (2013): 521-526.
Tai et al., "Real-Time Image Tracking for Automatic Traffic Monitoring and Enforcement Applications", Image and Vision Computing 22.6 (2004): 485-501.
Song et al., "Statistics Properties of Asphalt Pavement Images for Cracks Detection", Journal of Information and Computational Science 10.9 (2013): 2833-2843.
Koch et al., "Pothole Detection in Asphalt Pavement Images", Advanced Engineering Informatics 25.3 (2011): 507-515.
Zhang et al., "Video-Based Vehicle Detection and Classification System for Real-Time Traffic Data Collection Using Uncalibrated Video Cameras", Transportation Research Record: Journal of the Transportation Research Board 1993 (2007): 138-147.
Jahanshahi et al., "A Survey and Evaluation of Promising Approaches for Automatic Image-Based Defect Detection of Bridge Structures", Structure and Infrastructure Engineering 5.6 (2009): 455-486.
U.S. Appl. No. 61/567,962, filed Dec. 7, 2011, Baarman et al.
U.S. Appl. No. 15/366,615, filed Dec. 1, 2016, Newman.
U.S. Appl. No. 15/366,623, filed Dec. 1, 2016, Newman.
"Nexus 10 Guidebook for Android," Google Inc., © 2012, Edition 1.2, 166 pages.
"Self-Driving: Self-Driving Autonomous Cars," available at http://www.automotivetechnologies.com/autonomous-self-driving-cars, accessed Dec. 2016, 9 pages.
Amor-Segan et al., "Towards the Self Healing Vehicle," Automotive Electronics, Jun. 2007, 2007 3rd Institution of Engineering and Technology Conference, 7 pages.
Bennett, "Meet Samsung's Version of Apple AirPlay," CNET.com, Oct. 10, 2012, 11 pages.
Cairnie et al., "Using Finger-Pointing to Operate Secondary Controls in Automobiles," Proceedings of the IEEE Intelligent Vehicles Symposium 2000, Oct. 3-5, 2000, 6 pages.
Chen et al., "Learning-based spatio-temporal vehicle tracking and indexing for transportation multimedia database systems," IEEE Transactions on Intelligent Transportation Systems, 2003, vol. 4(3), pp. 154-167.
Clark, "How Self-Driving Cars Work: The Nuts and Bolts Behind Google's Autonomous Car Program," Feb. 21, 2015, available at http://www.makeuseof.com/tag/how-self-driving-cars-work-the-nuts-and-bolts-behind-googles-autonomous-car-program/, 9 pages.
Curio et al., "Walking Pedestrian Recognition," IEEE Transactions on Intelligent Transportation Systems, 2000, vol. 1(3), pp. 155-163.
Dantcheva et al., "Bag of Soft Biometrics for Person Identification," Multimedia Tools and Applications, Jan. 11, vol. 51(2), pp. 739-777.
Deaton et al., "How Driverless Cars Will Work," Jul. 1, 2008, HowStuffWorks.com. <http://auto.howstuffworks.com/under-the-hood/trends-innovations/driverless-car htm> Sep. 18, 2017, 10 pages.
Dumbaugh, "Safe Streets, Livable Streets: A Positive Approach to urban Roadside Design," Ph.D. dissertation for School of Civil & Environ. Engr., Georgia Inst. of Technology, Dec. 2005, 235 pages.
Fei et al., "A QoS-aware Dynamic Bandwidth Allocation Algorithm for Relay Stations in IEEE 802.16j-based Vehicular Networks," Proceedings of the 2010 IEEE Global Telecommunications Conference, Dec. 10, 2010, 10 pages.
Gandhi et al., "Pedestrian Protection Systems: Issues, Survey, and Challenges," IEEE Transactions on Intelligent Transportation Systems, 2007, vol. 8(3), pp. 413-430.
Gandhi et al., "Person Tracking and Reidentification: Introducing Panoramic Appearance Map (PAM) for Feature Representation" Machine Vision and Applications, 2007, vol. 18(3-4), pp. 207-220.
Ge et al., "Optimal Relay Selection in IEEE 802.16j Multihop Relay Vehicular Networks," IEEE Transactions on Vehicular Technology, 2010, vol. 59(5), pp. 2198-2206.
Guizzo, Erico, "How Google's Self-Driving Car Works," Oct. 18, 2011, available at https://spectrum.ieee.org/automaton/robotics/artificial-intelligence/how-google-self-driving-car-works, 5 pages.
Heer et al., "ALPHA: An Adaptive and Lightweight Protocol for Hop-by-hop Authentication," Proceedings of CoNEXT 2008, Dec. 2008, pp. 1-12.
Jahnich et al., "Towards a Middleware Approach for a Self-Configurable Automotive Embedded System," International Federation for Information Processing, 2008, pp. 55-65.
Junoh et al., "Crime Detection with ICA and Artificial Intelligent Approach," AMR Advanced Materials Research, 2013, vol. 816-817, pp. 616-622.
Kumar et al., "Framework for Real-Time Behavior Interpretation From Traffic Video," IEEE Transactions on Intelligent Transportation Systems, 2005, vol. 6(1), pp. 43-53.
Moghaddam et al., "Bayesian face recognition," Pattern Recognition, 2000, vol. 33(11), pp. 1771-1782.

(56) References Cited

OTHER PUBLICATIONS

Moradi et al., "A Real-Time Wall Detection Method for Indoor Environments," 2006 IEEE/RSJ International Conference on Intelligent Robots and Systems, 2006, 7 pages.

Nakajima et al., "Full-body Person Recognition System," Pattern Recognition, Jan. 2003, vol. 36(9), pp. 1997-2006.

Ozbay et al., "Automatic vehicle identification by plate recognition," World Academy of Science, Engineering and Technology, 2005, vol. 9(41), pp. 222-225.

Persson "Adaptive Middleware for Self-Configurable Embedded Real-Time Systems," KTH Industrial Engineering and Management, 2009, pp. iii-71 and references.

Raychaudhuri et al., "Emerging Wireless Technologies and the Future Mobile Internet," p. 48, Cambridge Press, 2011, 3 pages.

Shan et al., "Vehicle Identification between Non-overlapping Cameras without Direct Feature Matching," Tenth IEEE International Conference on Computer Vision (ICCV'05), 2005, vol. 1, n. pag.

Stephens, Leah, "How Driverless Cars Work," Interesting Engineering, Apr. 28, 2016, available at https://interestingengineering.com/driverless-cars-work/, 7 pages.

Stoller, "Leader Election in Distributed Systems with Crash Failures," Indiana University, 1997, pp. 1-15.

Strunk et al., "The Elements of Style," 3d ed., Macmillan Publishing Co., 1979, 3 pages.

Suwatthikul, "Fault detection and diagnosis for in-vehicle networks," Intech, 2010, pp. 283-286 [retrieved from: www.intechopen.com/books/fault-detection-and-diagnosis-for-in-vehicle-networks].

Walter et al., "The smart car seat: personalized monitoring of vital signs in automotive applications." Personal and Ubiquitous Computing, Oct. 2011, vol. 15, No. 7, pp. 707-715.

Wang, Xiaogang, "Intelligent Multi-camera Video Surveillance: A Review," Pattern Recognition Letters, 2013, vol. 34(1), pp. 3-19.

Wolf et al., "Design, Implementation, and Evaluation of a Vehicular Hardware Security Module," ICISC'11 Proceedings of the 14th Int'l Conf. Information Security & Cryptology, Springer-Verlag Berlin, Heidelberg, 2011, pp. 302-318.

Wu et al., "Viewpoint Invariant Human Re-Identification in Camera Networks Using Pose Priors and Subject-Discriminative Features," IEEE Transactions on Pattern Analysis and Machine Intelligence, May 2015, vol. 37(5), pp. 1095-1108.

Official Action for U.S. Appl. No. 15/366,615, dated Aug. 27, 2018 8 pages, Restriction Requirement.

Official Action for U.S. Appl. No. 15/366,623, dated Sep. 11, 2018 6 pages, Restriction Requirement.

Official Action for U.S. Appl. No. 15/366,615, dated Jan. 14, 2019 16 pages.

Official Action for U.S. Appl. No. 15/366,623, dated Nov. 27, 2018 9 pages.

Notice of Allowance for U.S. Appl. No. 15/366,615, dated Apr. 29, 2019 10 pages.

Final Action for U.S. Appl. No. 15/366,623, dated Apr. 23, 2019 9 pages.

Official Action for U.S. Appl. No. 15/366,623, dated Nov. 4, 2019 11 pages.

* cited by examiner

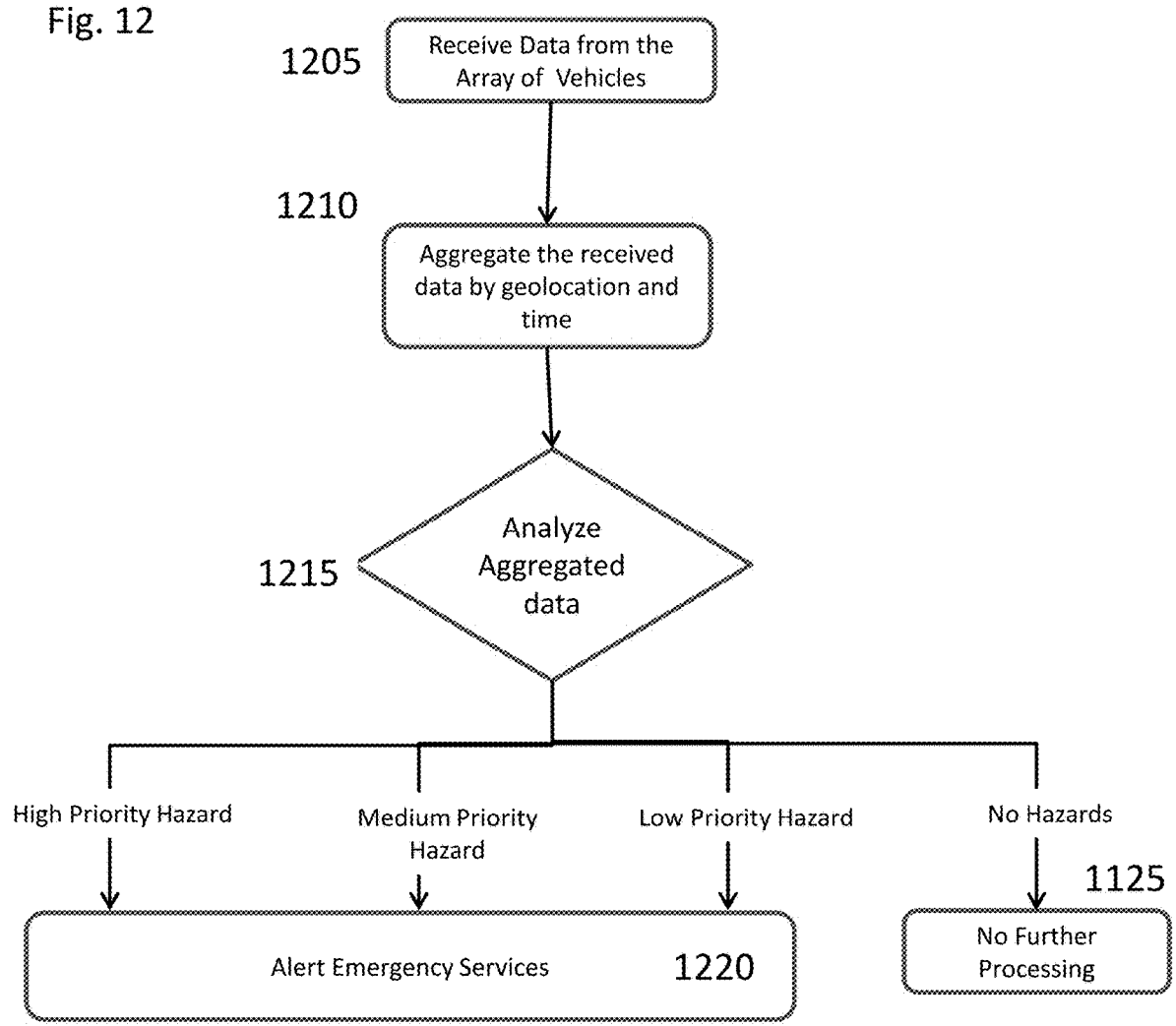

USING VEHICLE SENSOR DATA TO MONITOR ENVIRONMENTAL AND GEOLOGIC CONDITIONS

This application claims the benefit of U.S. Provisional Application No. 62/421,011 having a filing date of Nov. 11, 2016, which is incorporated by reference as if fully set forth.

BACKGROUND

There are currently an estimated 260 million cars in the United States that drive annually a total of 3.2 trillion miles. Each modern car has upwards of 200 sensors. As a point of reference, the Sojourner Rover of the Mars Pathfinder mission had only 12 sensors, traveled a distance of just over 100 meters mapping the Martian surface, and generated 2.3 billion bits of information including 16,500 pictures and made 8.5 million measurements. Therefore, there is an unrealized potential to utilize the over 200 sensors on the 260 million cars to collect detailed information about our home planet.

BRIEF DESCRIPTION OF THE DRAWING(S)

A more detailed understanding may be had from the following description, given by way of example in conjunction with the accompanying drawings wherein:

FIG. 12 is a block diagram for a process of monitoring environmental and geologic conditions.

DETAILED DESCRIPTION OF THE PREFERRED EMBODIMENTS

A wide array of sensors is required for the modern operation of a motor vehicle. These sensors are required for the vehicle to navigate, avoid collisions with other cars, and adjust the operating parameters of the drive systems. However, the data collected by these sensors is confined to the vehicle, is ephemeral and is only used locally in the vehicle. The present disclosure provides a system which utilizes the data already being collected by the motor vehicle to convert the motor vehicle into a "rolling laboratory" for geological and environmental conditions. Further, the system aggregates the data collected from a plurality of vehicles so that differential measurements can be performed on the same pedestrian from multiple perspectives and over multiple time periods.

Advanced driver assistance systems (ADAS) automate and enhance the safety system of a vehicle and provide a more pleasurable driving experience. Examples of ADAS systems currently available include Adaptive Cruise Control, Lane Departure Warning Systems, Blind Spot Detectors, and Hill Decent Control. In order to implement these systems a wide array of sensors are required.

The present scheme includes a network of cars, each equipped with an ADAS system, that are constantly collecting data about the environment surrounding the vehicle. This collected information is then analyzed by a vehicle computer. The vehicle computer then determines the existence of hazards and collects information about the environment in which the vehicle is traveling. Then, based on the determined hazards, the computer may transmit data to a server and contact emergency service officials.

Figure 1:
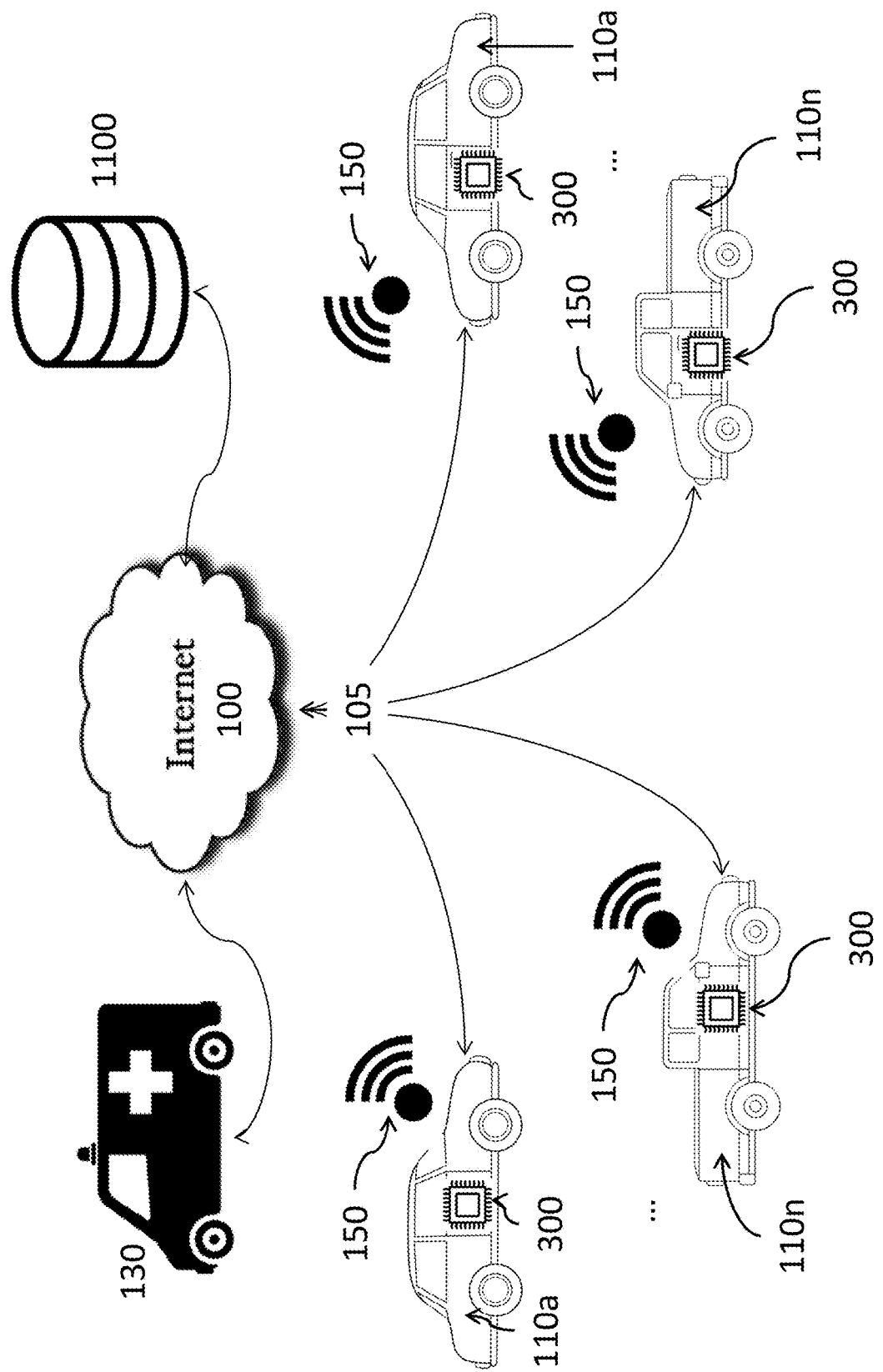
FIG. 1 is an example system that uses a network of vehicles to monitor pedestrians.

FIG. 1 depicts a diagram of an example system practicing the method of monitoring pedestrians. In the system, an array of vehicles 110A . . . 110B may be communicatively coupled to a database server 1100 and be connected to the Internet 100 via a wireless channel 105. The wireless communication channels 105 may be of the form of any wireless communication mechanism such as LTE, 3G, WiMax etc.

Each vehicle in the array of vehicles 110A . . . 110B may contain a vehicle computer (VC) 300 that is communicatively coupled to a plurality of sensors 150. The sensors 150 may include thermal imagers, LIDAR, radar, ultrasonic and High Definition (HD) cameras. In addition, sensors 150 may also additional sensors 280. The additional sensors 280 include Air Quality 280A, Temperature 280B, Radiation 280C, Humidity 280D, Magnetic Field and Pressure that are used to monitor various systems of the vehicle. For example, a temperature sensor is configured to generate a signal indicative of a temperature.

By way of another example, an air quality sensor 280A detects gasses and particles in the air, and/or measuring the amount of humidity in the air, O2 concentrations, CO2 concentrations, etc. Drive systems use this information to help control vehicle performance. In an exemplary embodiment, VC 300 may use this same information to detect an environmental condition, such as the existence of a fire (e.g., forest fire, house fire, vehicle fire, etc.), poor air quality, gas leaks, etc. In one example, if a number of vehicles with equipped sensors detect an elevated level of CO2 in the air and transmit the information to the database server 1100, that may indicate that there is a fire in the area, and emergency services providers 130 should be dispatched. Further, if the O2 levels are determined to be particularly low in an area, an air quality alert may be issued by the emergency services providers 130. Another possibility is that if the air sensors of the vehicle detected other nuclear or toxic elements, it could be an indicator of a chemical or gas leak.

An example of another sensor that may be included in the additional sensors 280 is a rain sensor. This sensor may already be used by a vehicle controller to turn the headlights on, turn on the windshield wipers, and in some circumstances, change the operating parameters of the vehicle in response to the wet conditions. This information could also be utilized to develop by the database server 1100 to develop hyper-localized weather reports and forecast. The exact location, and potentially the intensity of the rain storm, could be inferred by the respective measurements of the sensors on the array of vehicles.

Both the array of vehicles 110A . . . 110B and the database server 1100 may communicate with emergency services providers 130 over the Internet. The emergency services providers 130 may include fire, police or medical services.

Figure 2:
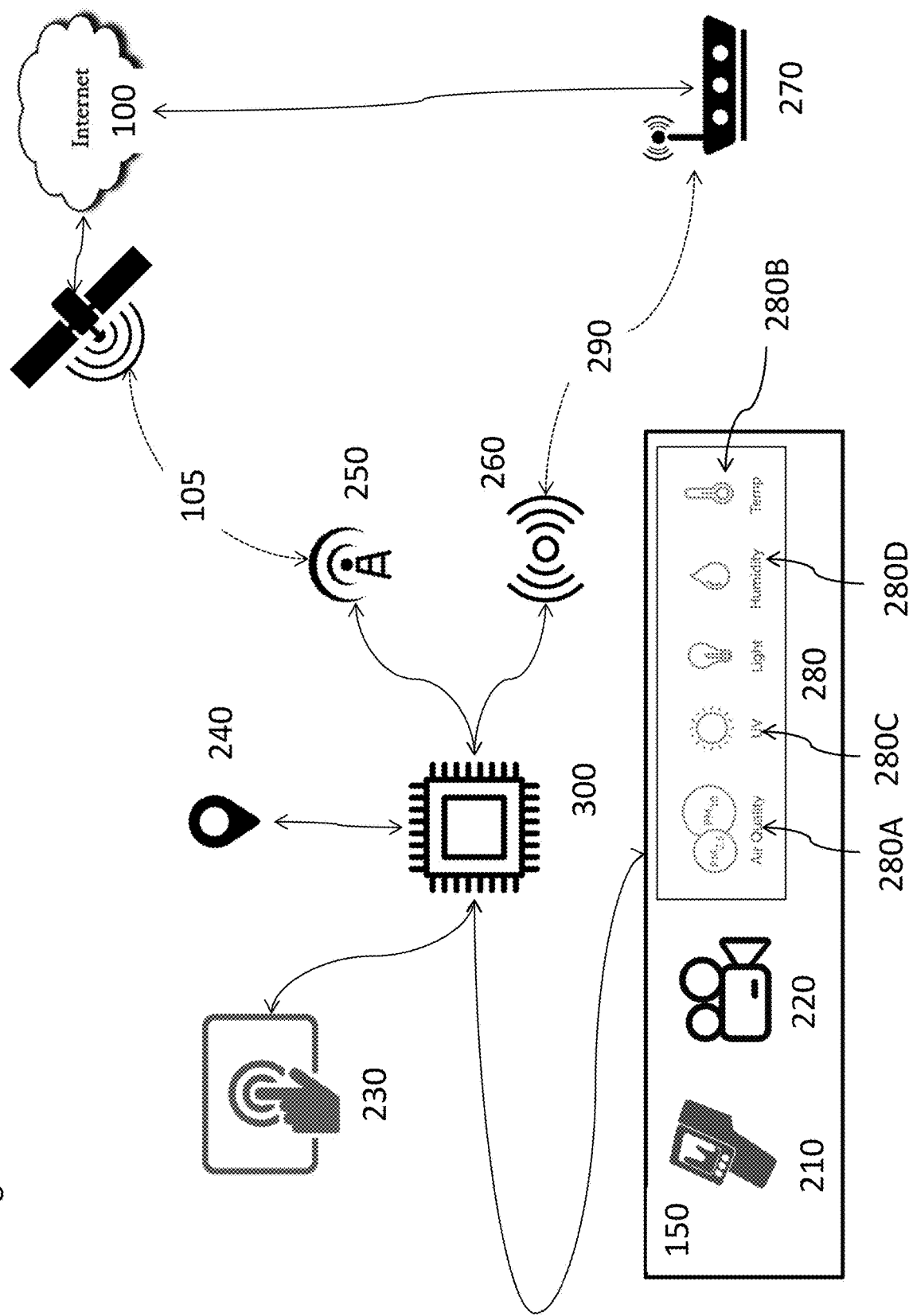
FIG. 2 is a communication diagram for a vehicle.

The communicative connections of the VC 300 are graphically shown in FIG. 2. The VC 300 is communicatively coupled to a user interface 230. The VC 300 may instruct the user interface 230 to display information stored in the memory 310 or storage 320 of the VC 300. In addition, the VC 300 may instruct the user interface 230 to display alert messages. The user interface 230 may include a touch screen that enables the user to input information to the VC 300. The user interface 230 may be a discrete device or integrated into an existing vehicle entertainment or navigation system.

The VC 300 may also be able to communicate with the Internet 100 via a wireless communication channel 105. A database server 1100 is also connected to the Internet 100 via communication channel 125. It should be understood that the Internet 100 may represent any network connection between respective components.

The VC 300 is also communicatively coupled to a real time communication interface 250. The real time communication interface 250 enables the VC 300 to access the Internet 100 over wireless communication channel 105. This enables the VC 300 to store and retrieve information stored in database server 1100 in real time. The real time communication interface 250 may include one or more antennas, receiving circuits, and transmitting circuits. The wireless communication channel 105 provides near real time communication of the VC 300 to the database 1100 while the vehicle is in motion.

Additionally, the VC 300 may communicate with the Internet 100 through short range wireless interface 260 over short arrange wireless communication channel 290 via an access point 270. Wireless channel 290 may be 802.11 (WiFi), 802.15 (Bluetooth) or any similar technology. Access point 270 may be integrated in the charging unit of an electric vehicle, located at a gas refueling station, or be located in an owner's garage. The wireless channel 290 allows the VC 300 to quickly and cheaply transmit large amounts of data when the vehicle is not in motion, and real time data transmission is not required.

When the VC 300 detects that the short range wireless interface 260 is connected to the Internet 1100, the VC 300 transmits the data stored in storage 320 to the database 1100 over short range wireless channel 290. The VC 300 may then delete the data stored in storage 320.

The VC 300 may also be communicatively linked to a geo locating system 240. The geo locating system 240 is able to determine the location of the vehicle 110 based on a locating standard such as the Global Positioning System (GPS) or Galileo.

The VC 300 may also be communicatively linked to the plurality of sensors 150. The plurality of sensors may include one or more thermal imager 210 and one or more High Definition Camera 220 and additional sensors 280. The thermal imager 210 may include any form of thermographic cameras such as a Forward Looking Infrared (FLIR) camera. The high definition cameras 220 may include any form of digital imaging device that captures images in the visible light spectrum.

Figure 3:
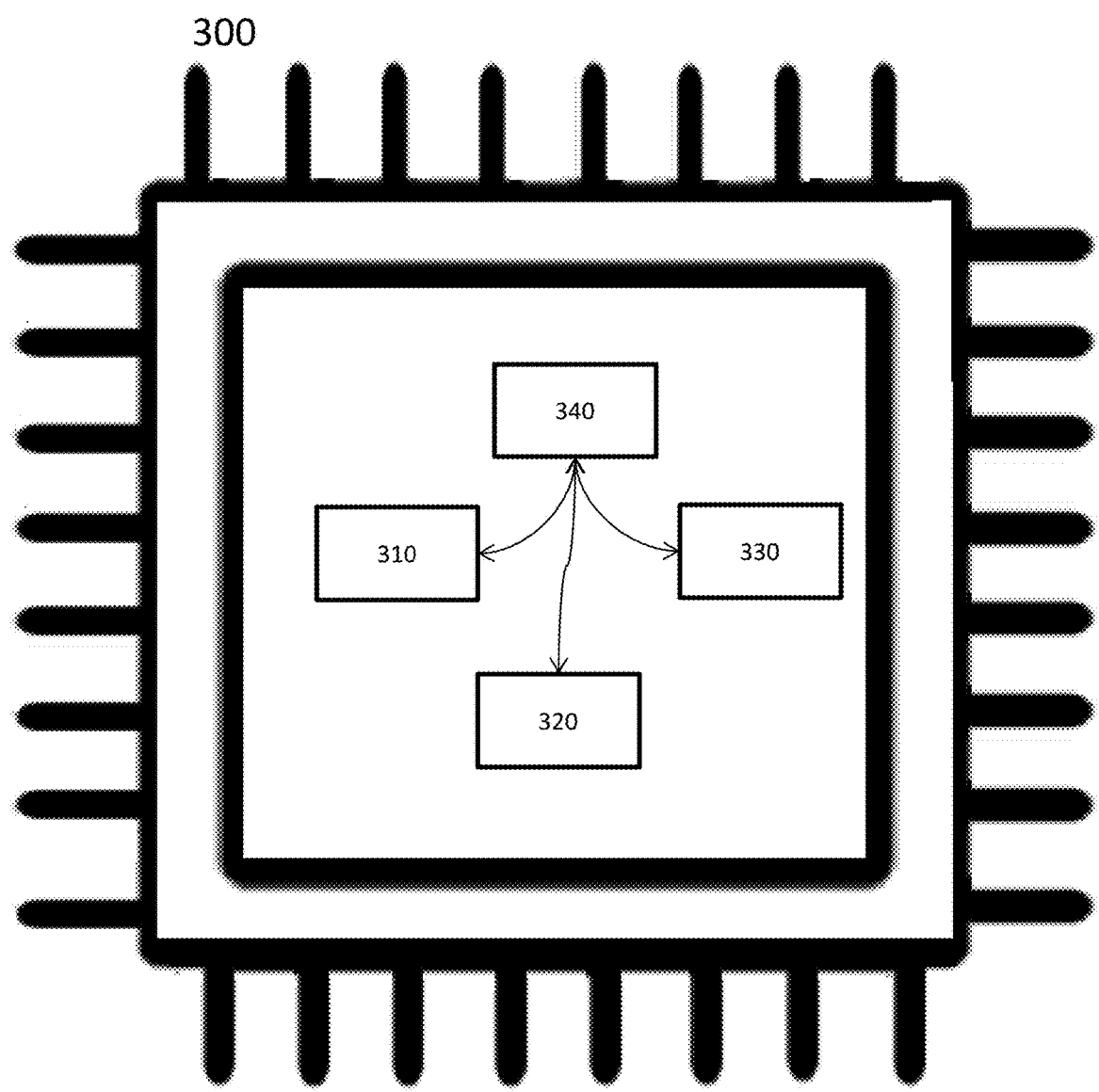
FIG. 3 is a block diagram of the electric vehicle computer.

FIG. 3 depicts a block diagram of the VC 300. The VC 300 includes an Input/Output interface 330. The Input/Output interface 330 may facilitate communication of data with the plurality of sensors 150, user interface 230, geo locating system 240, real time communication interface 250 and short range wireless interface 260. The VC 300 also includes a processor 330 that is communicatively linked to the Input/Output interface 330, the memory 310 and the storage 320. The storage 320 may be a hard disk drive, solid state drive or any similar technology for the nonvolatile storage and retrieval of data.

Figure 4:
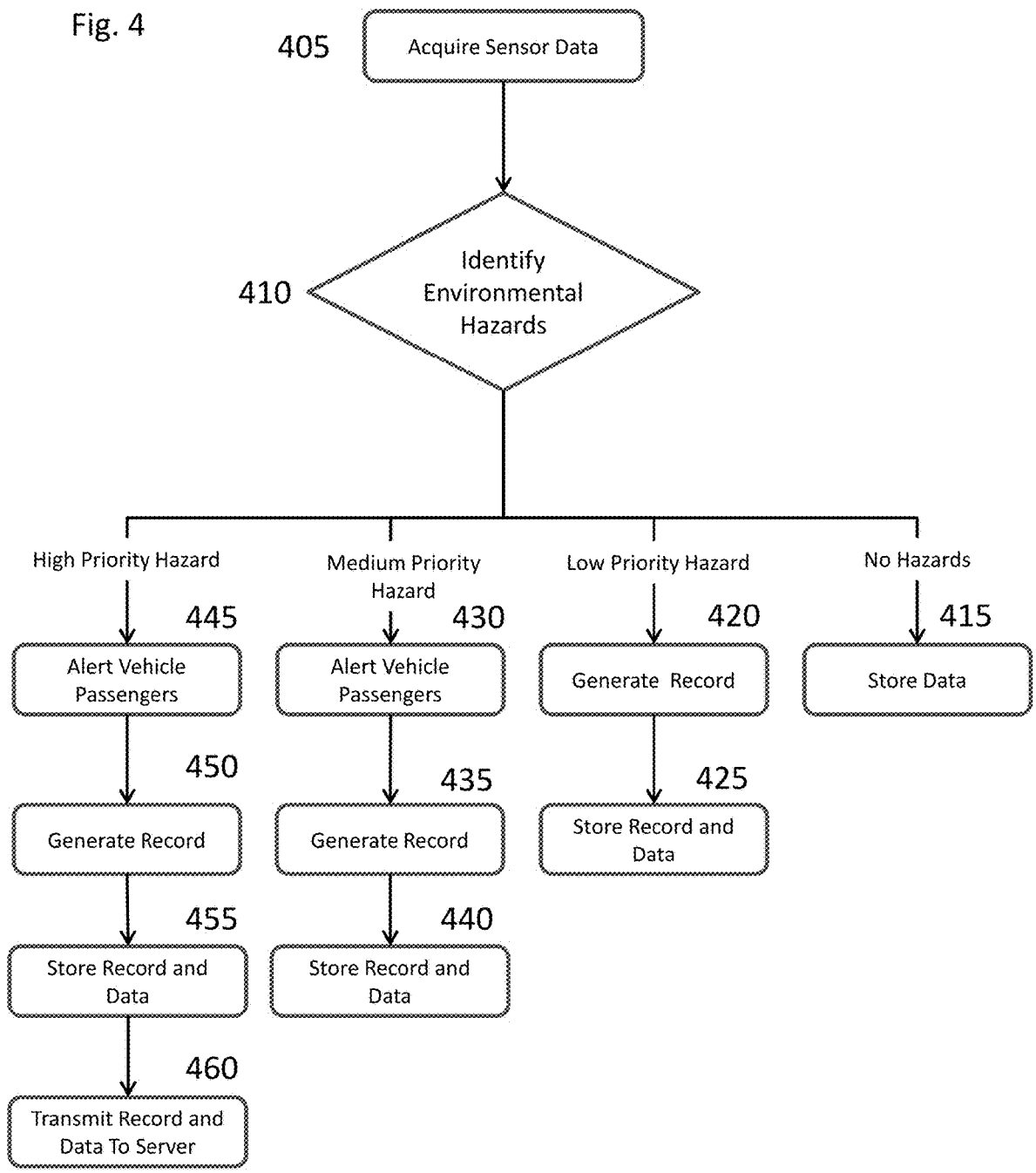
FIG. 4 is a block diagram for a process of monitoring environmental and geologic conditions.

FIG. 4 depicts a method for monitoring the geological and environmental conditions that may be implemented by the processor 330. A plurality of data items are acquired (405) from the thermal imager 210, the HD Camera 220 and the additional sensors 280. The acquired data is then analyzed (410) to determine if the data indicates an environmental hazard.

The images may be analyzed to determine a hazard using any method known in the art such as "The Pothole Patrol" (Eriksson, Jakob, Lewis Girod, Bret Hull, Ryan Newton, Samuel Madden, and Hari Balakrishnan. "The Pothole Patrol." Proceeding of the 6th International Conference on Mobile Systems, Applications, and Services—MobiSys '08 (2008): n. pag), and "Image Sequences Based Traffic Incident Detection for Signaled Intersections Using HMM" (Zou, Yuexian, Guangyi Shi, Hang Shi, and Yiyan Wang. "Image Sequences Based Traffic Incident Detection for Signaled Intersections Using HMM." 2009 Ninth International Conference on Hybrid Intelligent Systems (2009): n. pag.) which are hereby incorporated herein by reference.

If the images are determined to not contain a hazard, no further processing of the data is required (415), and the acquired data are stored in the storage 320.

If the analysis of the data reveals a low priority hazard, a record is generated (420). The record includes the time, date, and geo-location data obtained by the geolocation system 240. In addition, the record also contains the data from the sensors 150 that result in the determination of the hazard. This information is stored (425) in the storage 320. Examples of low priority hazards include a pothole or street light that is not properly illuminating. Other low priority hazards may include information about structures of bridges and roadways. For example, excessive rust on a highway overpass would be determined to be a low priority hazard. In these cases, the immediate attention of the vehicles occupants and emergency service providers 130 are not required.

If a medium priority hazard is identified, the occupants of the vehicle are alerted (430) via the user interface 230 and a record is generated (435). The record includes the time, date, and geo-location data obtained by the geolocation system 240. In addition, the record also contains the data from the sensors 150 that result in the determination of the hazard. This information is stored (440) in the storage 320. Examples of medium priority hazards include changes in weather conditions, changes in lighting or excessive traffic.

The weather based roadway hazards may be determined by implementing any methods known in the art such as taught in "Detection of Inclement Weather Conditions at a Signalized Intersection Using a Video Image Processing Algorithm" (Sharma, Anuj, Darcy Bullock, Srinivas Peeta, and James Krogmeier. "Detection of Inclement Weather Conditions at a Signalized Intersection Using a Video Image Processing Algorithm." 2006 IEEE 12th Digital Signal Processing Workshop & 4th IEEE Signal Processing Education Workshop (2006): n. pag.) which is hereby incorporated herein by reference.

The traffic based roadway hazards may be determined by implementing any methods known in the art such as taught in "Highway Traffic Automatic Detection System Based on Video and Image Processing" (Ying, Jiang. "Highway Traffic Automatic Detection System Based on Video and Image Processing." Intelligence Computation and Evolutionary Computation Advances in Intelligent Systems and Computing (2013): 521-26), which is hereby incorporated herein by reference.

Figure 5:
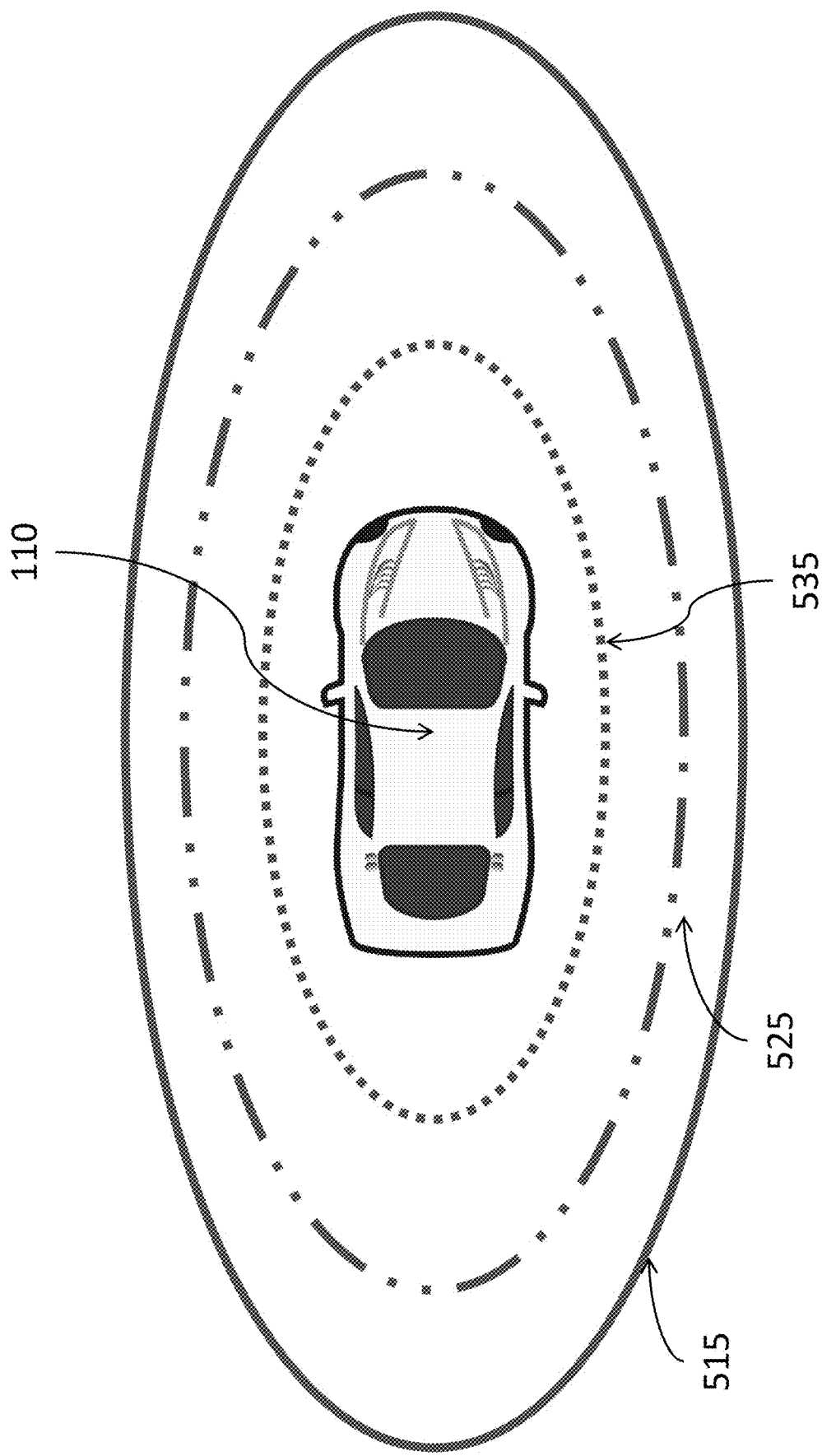
FIG. 5 is an illustration of the "Bubbles of Vision" of a vehicle.

If a high priority hazard is identified, the occupants of the vehicle are alerted (445) via the user interface 230 and a record is generated (450). The record includes the time, date, and geo-location data obtained by the geolocation system 240. In addition, the record also contains the data from the sensors 150 that result in the determination of the hazard. This information is stored (455) in the storage 320 and is transmitted (460) to emergency service providers 130 using the real time communication channel 105. Examples of high priority hazards include car accidents, fires, fallen trees, and impassible roads FIG. 5 depicts various "Bubbles of Vision" associated with the different sensors 150. For example, certain sensors have a higher resolution and limited sensing distance 535 from the vehicle 110. Other sensors have a much longer sensing range but have lower resolution 515. Yet other sensors operate in a medium sensing distance and resolution 525. Although only discrete Bubbles are shown, a person of ordinary skill would understand that any number of layers can be included. Further, the Bubbles are shown depicted as oval merely for convenience, and the sensors 150 may produce sensing ranges of any shape.

Figure 6:
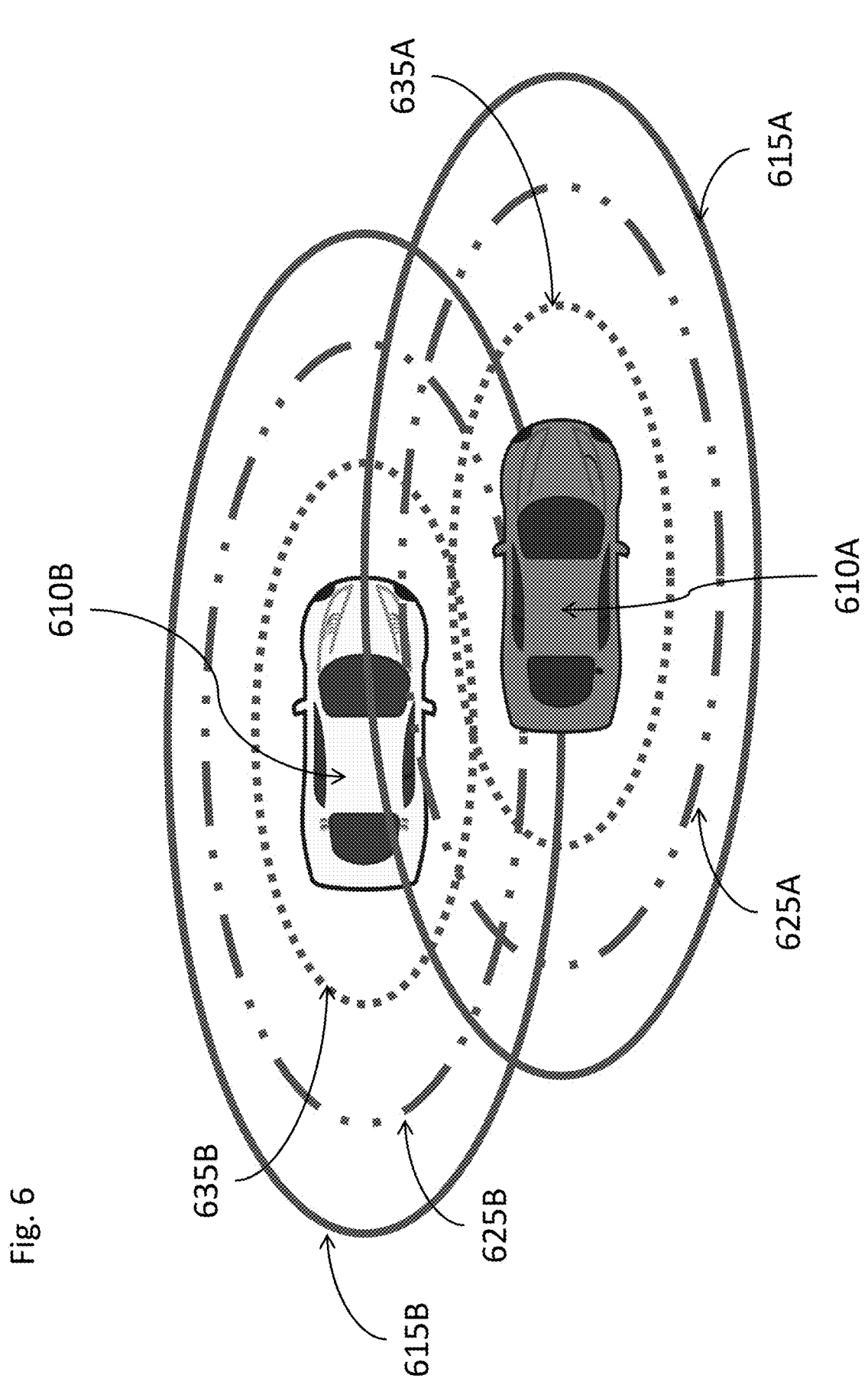
FIG. 6 is an illustration of the interaction of the "Bubbles of Vision" of two vehicles.

FIG. 6 depicts the interaction of the "Bubbles of Vision" associated with two different vehicles 610A and 610B. Each vehicle has an associated inner Bubble of Vision 635A and 335B, outer Bubble of Vision 615A and 615B, and intermediate Bubble of Vision 625A and 625B. As a result of the overlapping Bubble of Vision, multiple views and prospective of an object can be measured. The multiple views and prospective of the same object may be used to further identify the object or to calibrate the sensors on a particular vehicle relative to another vehicle.

Figure 7:
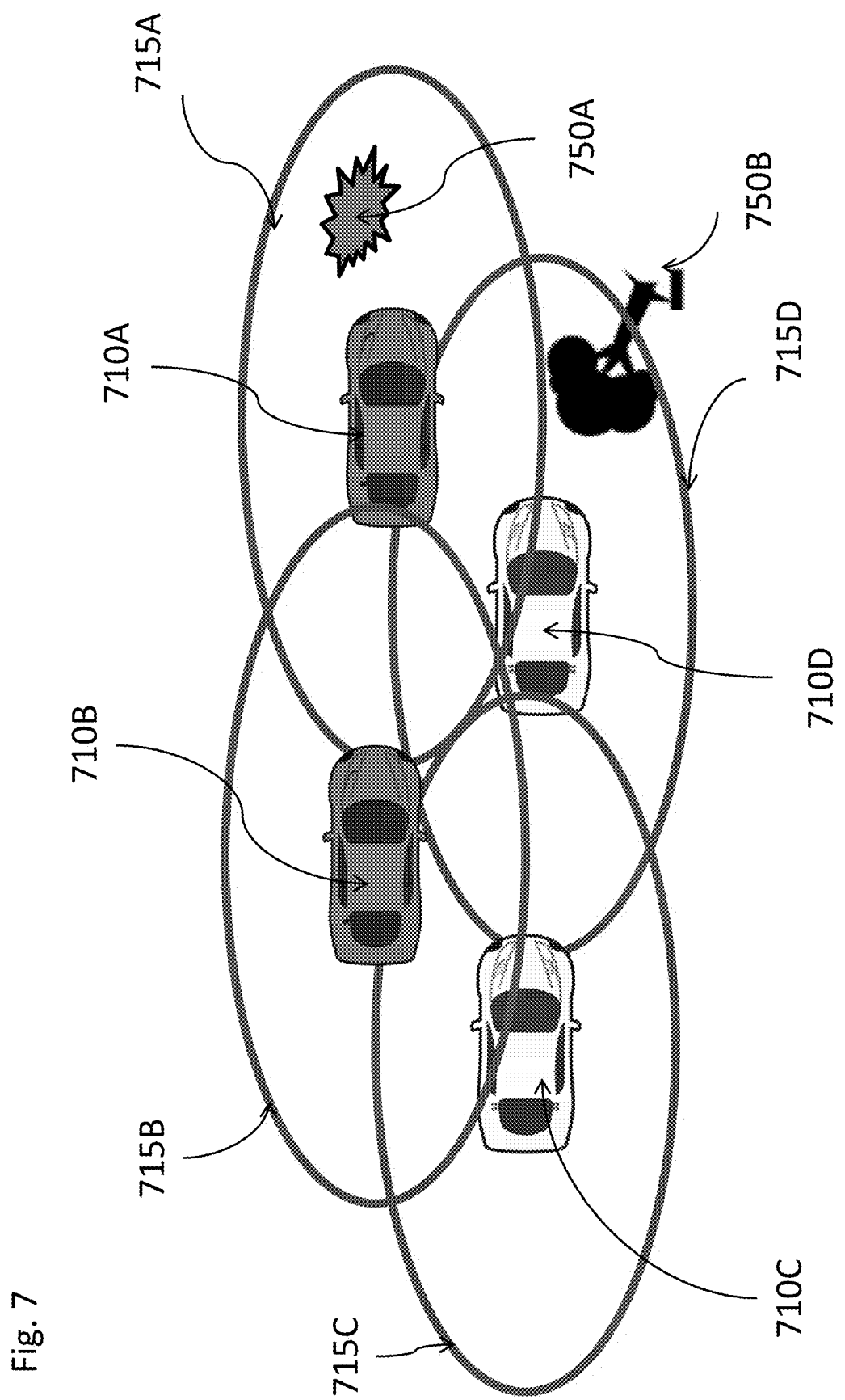
FIG. 7 is an illustration of potential identified hazards.

FIG. 7 shows an illustration of an example roadway environment. In this illustration, four vehicles 710A, 710B, 710C and 710D are depicted. Each vehicle includes an outer Bubble of Vision 715A, 715B, 715C and 715D, respectively. Roadway 750A is located within the Bubble of Vision 715C of Vehicle 710C. Accordingly, in Step 410 the Vehicle 710C will identify roadway hazard 750A. The 710C will determine that roadway hazard 750A is a low priority hazard because it is a pot hole. This acquired sensor data will be stored (step 415) in and will subsequently be uploaded to the database server 1100 when the short range communication channel 290 is available.

Road hazard 750B lies within Bubble of Vision 715D of Vehicle 710D. Accordingly, in Step 410, the Vehicle 710D will identify roadway hazard 750D. The 710C will determine that roadway hazard 750A is a high priority hazard because it is a fallen tree that is obstructing a lane of travel. As a result, the vehicle's passengers are alerted (step 445), a record is generated (step 450), the record is stored (step 455) and the record is transmitted to the database server 1100 over the real time communication channel 105. The database server may subsequently relay the high priority hazard data to emergency service providers 130.

Figure 8:
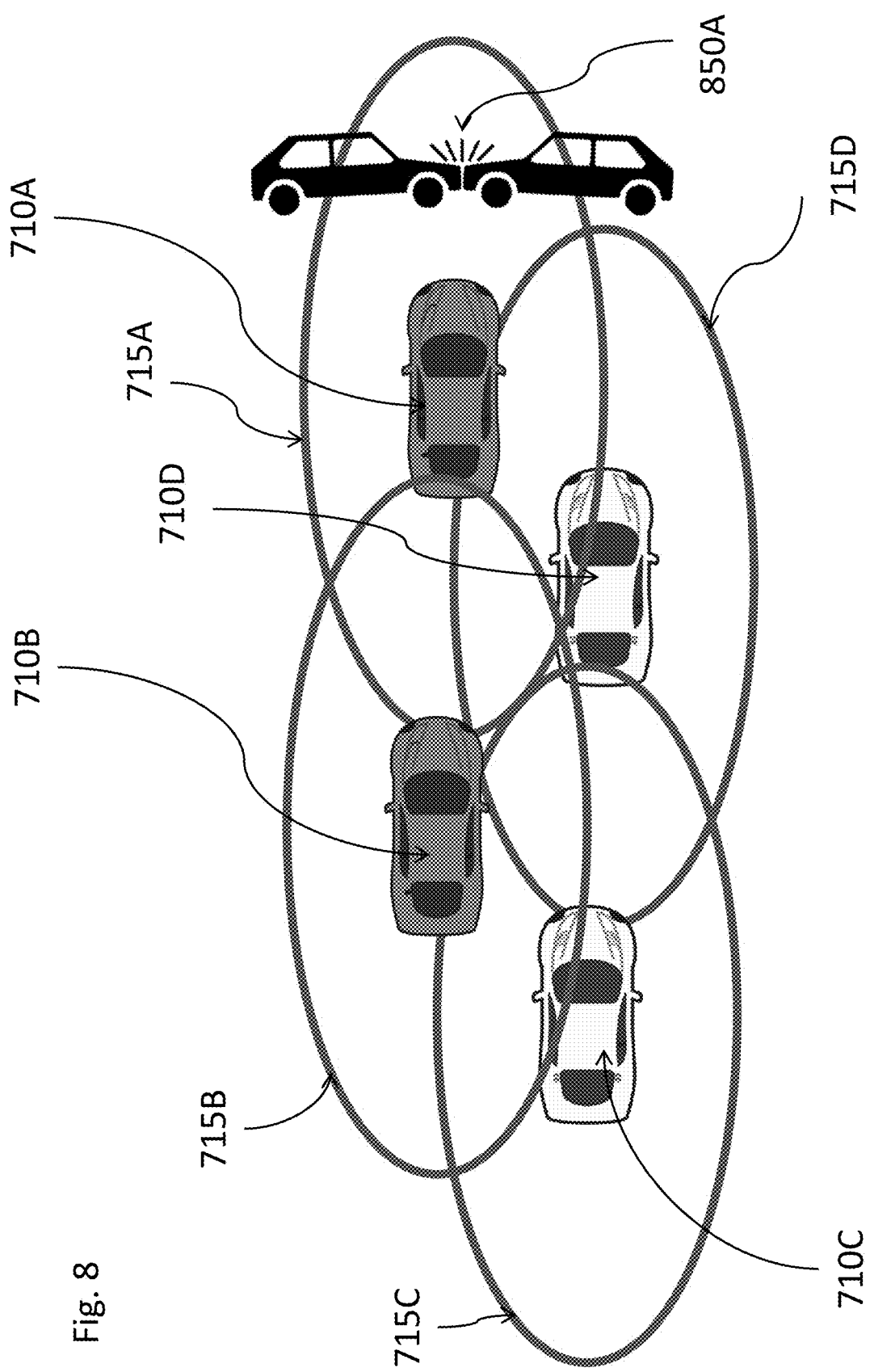
FIG. 8 is an illustration of other potential identified hazards.

Another roadway condition is illustrated in FIG. 8. In this illustration, roadway hazard 850A is within Bubble of Vision 715A. Therefore, in Step 410 the vehicle 710A would identify road hazard 850A. Vehicle 710A would identify road hazard 850A as a high priority road hazard because it is a car accident. As a result, the vehicle's passengers are alerted (step 445), a record is generated (step 450), the record is stored (step 455) and the record is transmitted to the database server 1100 over the real time communication channel 105. The database server may subsequently relay the high priority hazard data to emergency service providers 130.

The system is able to identify that a car accident has occurred by implementing any method known in the art, such as the method taught in "Real-time Image Tracking for Automatic Traffic Monitoring and Enforcement Applications" (Tai, Jen-Chao, Shung-Tsang Tseng, Ching-Po Lin, and Kai-Tai Song. "Real-time Image Tracking for Automatic Traffic Monitoring and Enforcement Applications." Image and Vision Computing 22.6 (2004): 485-501), which is hereby incorporated herein by reference.

Figure 9:
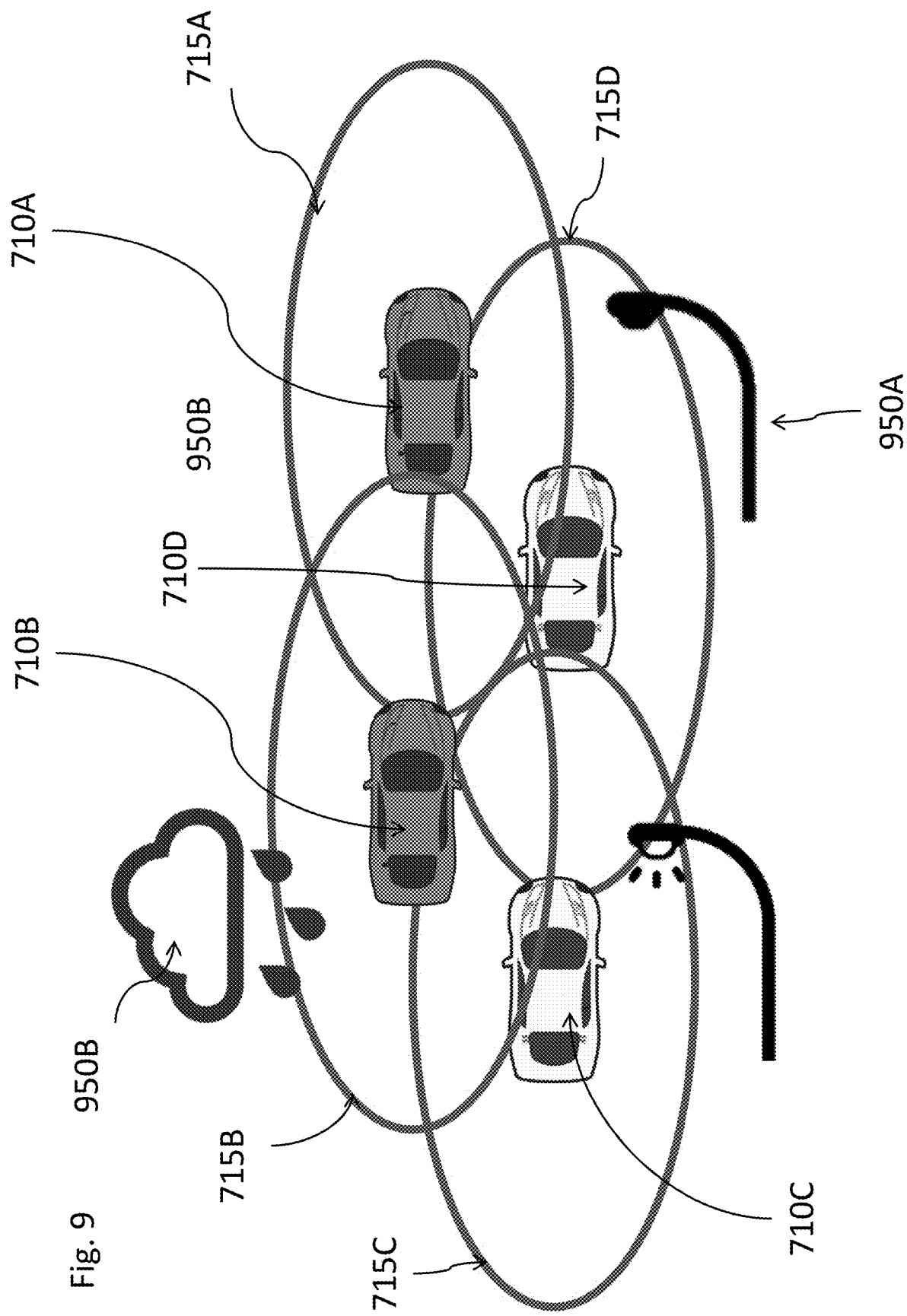
FIG. 9 is an illustration of other of potential identified hazards.

FIG. 9 depicts another set of roadway hazards. Specifically, road hazard 950B is depicted as raining in Bubble of Vision 715B of vehicle 710B. Therefore, 710B will identify that road hazard 950B as a medium priority hazard, because it represents a change in weather conditions. Consequently, vehicle 710B will alert the vehicle's passengers (step 430), generate a record (step 435), store the record (step 440).

Road hazard 950B is also depicted in FIG. 9. Vehicle 710D would detect road hazard 950B because the hazard is located within Bubble of Vision 715D. The 710D will determine that roadway hazard 950A is a low priority hazard because it is a pot hole. This information will be stored (step 415) in and will subsequently be uploaded to the database server 1100 when the short range communication channel 290 is available.

Figure 10:
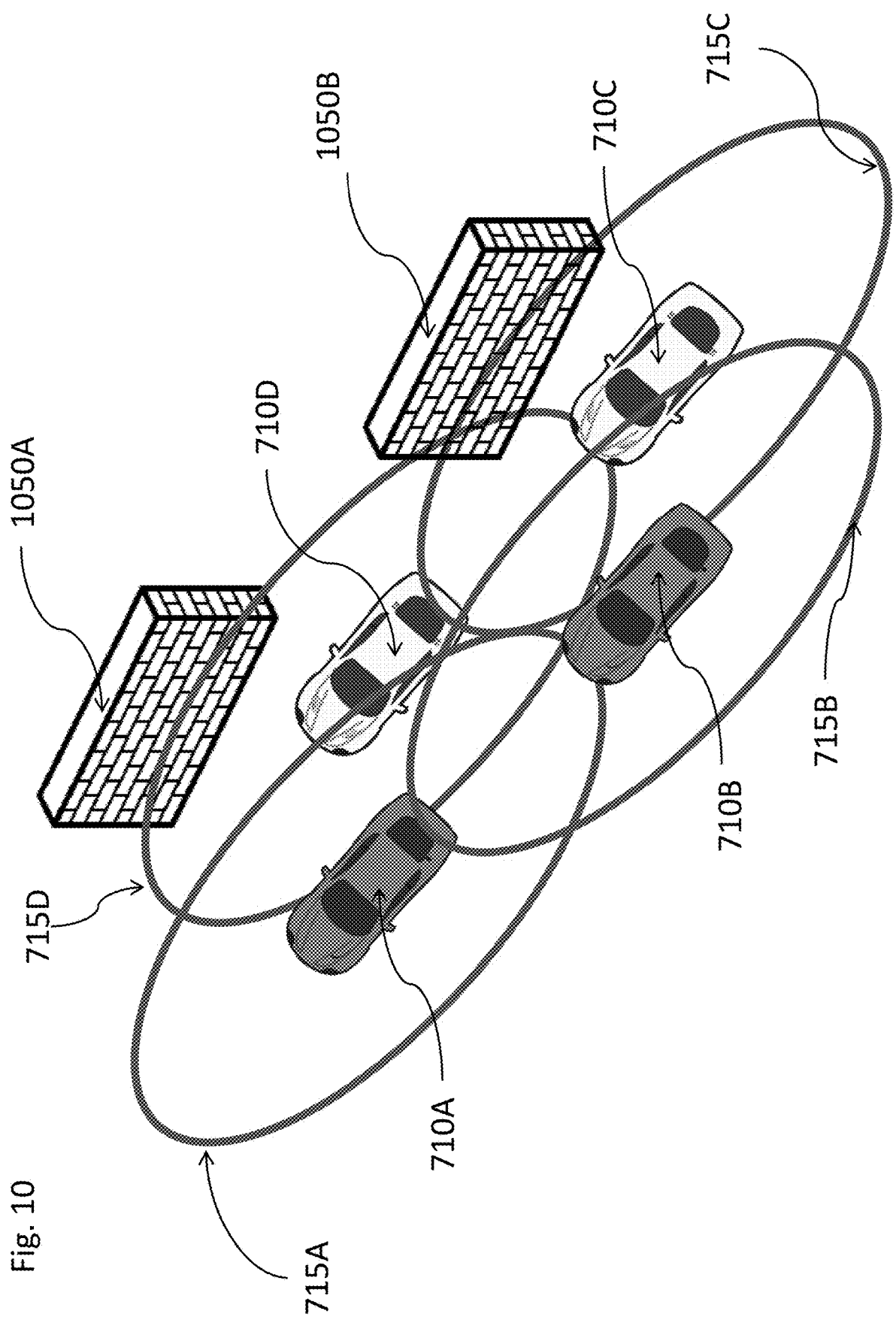
FIG. 10 is an illustration of other potential identified hazards.

FIG. 10 depicts another set of roadway hazards. For example, roadway hazards 1050A and 1050B may be a structure within the Bubble of Vision of the vehicles, These structures may include bridges, overpasses and buildings. Roadway hazards 1050A and 1050B are located in the Bubble of Vision of Vehicle 710D and 710C, and, therefore, the vehicles 710C and 710D will identify the hazards as low priority. Since 1050A and 1050B are low priority hazard the acquired data will be stored (step 415) in and will subsequently be uploaded to the database server 1100 when the short range communication channel 290 is available.

Figure 11:
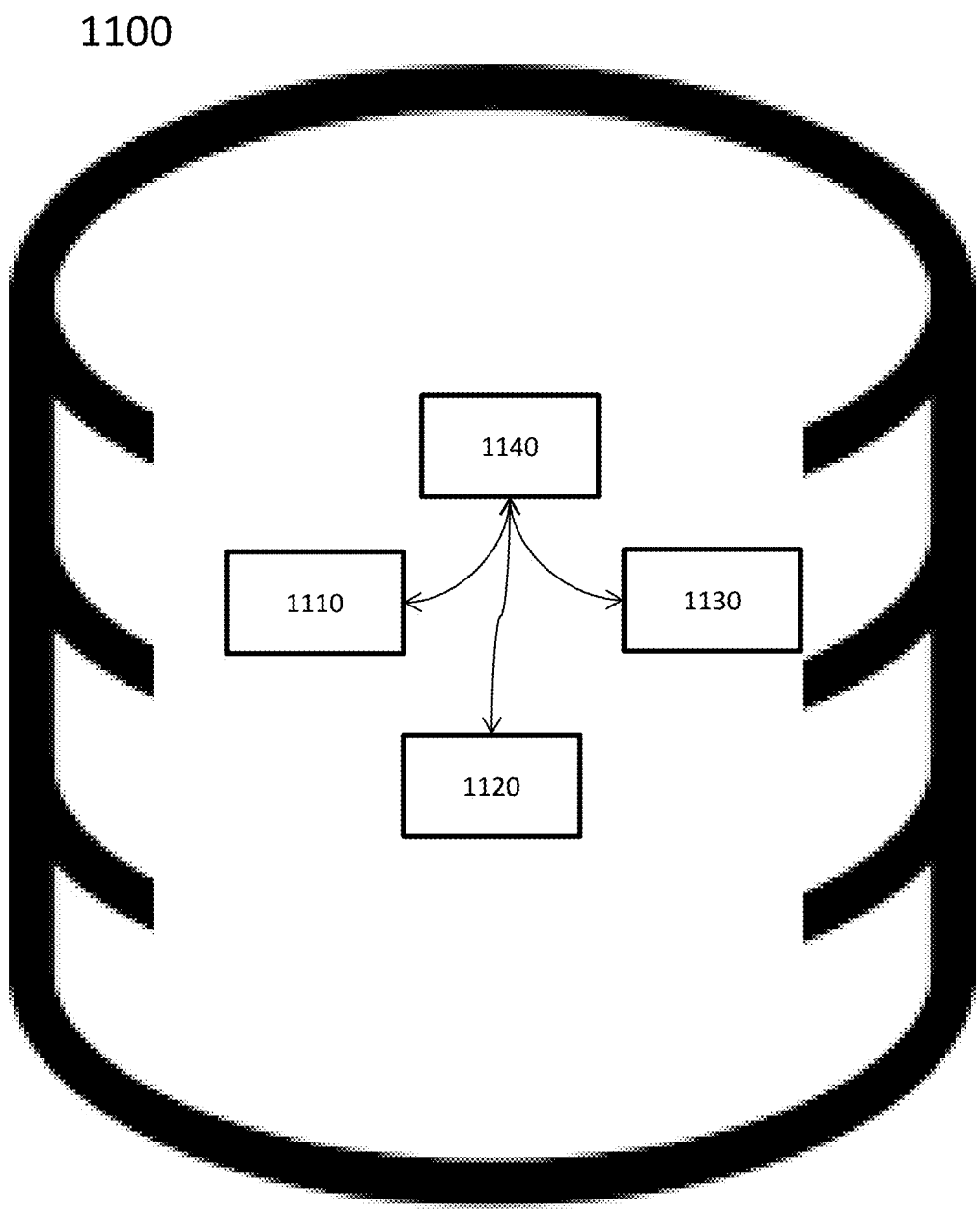
FIG. 11 is a block diagram of the database server.

FIG. 11 depicts the components of the database server 1100. The database server 1100 may include a memory 1110, a communication interface 1130, storage 1120 and a processor 1140. The processor 1140 is able to transmit and receive information from the Internet 100 via the communication interface 1130. In addition, the processor 1140 is able to store data received by the communication 1130.

FIG. 12 is a block diagram for the process implemented by the database server 1100 for monitoring pedestrians based on data acquired from the array of vehicles 110*a* . . . 110*n*. Data acquired from the plurality of when the data is received (1205) from the individual vehicles via the real time communication channel 105 and the short range communication channel 210. The data may include the raw data collected by the plurality of sensors 150, thermal images acquired by the thermal imager 210, high definition images captured by HD camera 220, geolocation data determined by the geo locating system 240 and data when the information was recorded. In addition, the data may include identifiers that identify which vehicle 110 from the array of vehicles 110*a* . . . 110*n* that acquired the data.

The received data is then aggregated (1210) based on the location where the data was collected and the time when it was collected. The aggregated data is then analyzed (1215) to determine if hazard conditions are detected. In the event that the analysis reveals no hazards, no further action is taken (1125).

If the result of the analysis 1215 is that low priority hazards are detected, such as a pot hole, an alert is sent to emergency services 130. The alert may contain information about how the low priority hazard has changed over time. For instance, the alert may indicate that the pot hole is increasing in size.

The analysis can be performed using any method known in the art such as taught in "Statistics Properties of Asphalt Pavement Images for Cracks Detection" (Song, Beibei. "Statistics Properties of Asphalt Pavement Images for Cracks Detection." Journal of Information and Computational Science 10.9 (2013): 2833-2843) and "Pothole Detection in Asphalt Pavement Images" (Koch, Christian, and Ioannis Brilakis "Pothole Detection in Asphalt Pavement Images" Advanced Engineering Informatics 25.3 (2011): 507-515) which are hereby incorporated herein by reference.

Based upon the analysis of the aggregated data, medium priority hazard alerts can be generated. For instance, in the case of a storm, emergency services can be alerted 1220 of the location of where the conditions are the most severe. Further traffic alerts can be generated based upon the aggregated data.

Methods to generate traffic alerts based on the aggregated data include the methods taught in "Video-Based Vehicle Detection and Classification System for Real-Time Traffic Data Collection Using Uncalibrated Video Cameras" (Zhang, Guohui, Ryan Avery, and Yinhai Wang. "Video-Based Vehicle Detection and Classification System for Real-Time Traffic Data Collection Using Uncalibrated Video Cameras." Transportation Research Record: Journal of the Transportation Research Board 1993 (2007): 138-47), which is hereby incorporated herein by reference.

Based on the analysis 1215 of the aggregated data, a high priority hazard may be identified based upon data that was identified as low priority by individual vehicles. For example, structures would be identified as low priority hazards. However, an analysis of the structures over time may indicate a decline in the integrity of a structure. For instance, by comparing measurements of a structure over time, the system can determine that the size of cracks have increased or that the angle of a wall has changed. When such a high priority hazard is detected, emergency service providers 130 are alerted 1220 so that action can be taken prior to a catastrophic failure.

The analysis of the aggregated data to determine high priority hazards may be performed using any method known in the art including "A Survey and Evaluation of Promising Approaches for Automatic Image-based Defect Detection of Bridge Structures" (Jahanshahi, Mohammad R., Jonathan S. Kelly, Sami F. Masri, and Gaurav S. Sukhatme. "A Survey and Evaluation of Promising Approaches for Automatic Image-based Defect Detection of Bridge Structures." Structure and Infrastructure Engineering 5.6 (2009): 455-86), which is hereby incorporated herein by reference.

Although features and elements are described above in particular combinations, one of ordinary skill in the art will appreciate that each feature or element can be used alone or in any combination with the other features and elements. In addition, any of the steps described above may be automatically performed by either the VC 300 or database server 1100.

Furthermore, the methods described herein may be implemented in a computer program, software, or firmware incorporated in a computer-readable medium for execution by a computer or processor. Examples of computer-readable media include electronic signals (transmitted over wired or wireless connections) and non-transitory computer-readable storage media. Examples of non-transitory computer-readable storage media include, but are not limited to, a read only memory (ROM), a random access memory (RAM), a register, cache memory, semiconductor memory devices, magnetic media, such as internal hard disks and removable disks, magneto-optical media, and optical media such as CD-ROM disks, and digital versatile disks (DVDs).

What is claimed is:

1. An apparatus of a vehicle for monitoring environmental conditions surrounding the vehicle, the apparatus comprising:
   a plurality of sensors of the vehicle comprising at least one thermal imager, at least one high-definition imager, and an air quality sensor, wherein each of the at least one thermal imager and the at least one high-definition imager has a respective bubble of vision;
   a real-time communication interface that communicates information from the vehicle across a wireless communications channel while the vehicle is in motion;
   a short-range communication interface that communicates information from the vehicle across a short-range communications channel when the vehicle is stopped and is in range of the short-range communications channel;
   a geolocation system to determine a location of the vehicle at a selected point in time; and
   a vehicle computer communicatively coupled to the plurality of sensors, the geolocation system, the real-time communication interface, and the short-range communication interface, wherein the vehicle computer:
   receives, from the plurality of sensors, environmental information of the environment in which the vehicle is traveling, the environmental information comprising a plurality of thermal images, a plurality of high-definition images, and gas and particulate information defining a condition of the environment;
   determines, based on the environmental information, whether a hazard exists in the environment;
   determines, when the hazard is determined to exist in the environment, whether the hazard is a low-priority hazard associated with the environmental information comprising information about structures in the environment, a medium-priority hazard associated with the environmental information comprising information about a change in lighting or weather conditions in the environment, and a high-priority hazard associated with the environmental information comprising information about a fire or a fallen tree in the environment;
   stores, in a memory of the vehicle, the environmental information associated with the determined hazard along with a location of the vehicle at a time when the environmental information is received;
   displays, via a display device inside the vehicle only when the hazard that exists in the environment is determined to be the medium-priority hazard or the high-priority hazard, an alert informing occupants of the vehicle of the medium-priority hazard or the high-priority hazard;
   transmits, via the real-time communication interface, only the stored environmental information associated with the high-priority hazard when the hazard that exists in the environment is determined to be the high-priority hazard, to a database server in real time, and
   transmits, via the short-range communication interface, only the stored environmental information associated with the low-priority hazard or the medium-priority hazard when the hazard that exists in the environment is determined to be the low-priority hazard or the medium-priority hazard, to the database server when the vehicle is stopped and is in range of the short-range communications channel.

2. The apparatus of claim 1, wherein the air quality sensor detects an amount of gas in air of the environment, and wherein the amount of gas in the air indicates the hazard is the high-priority hazard associated with the fire in the environment.

3. The apparatus of claim 1, wherein the environmental information is stored in the memory of the vehicle as a record comprising a time of detection of the determined hazard, a date of detection of the determined hazard, and the location of the vehicle at the time of detection of the determined hazard, and wherein the vehicle computer, in response to determining the hazard is the high-priority hazard, transmits the record to an emergency service provider using the real-time communication interface in real time.

4. The apparatus of claim 3, wherein the high-priority hazard is the fallen tree blocking, or potentially blocking, a roadway in the environment, and wherein the low-priority hazard is poor air quality in the environment measured by the air quality sensor.

5. The apparatus of claim 1, wherein the information about structures in the environment comprises corrosion information associated with at least one of bridges, overpasses, and other structures crossing over a roadway in the environment that is detected by one or more of the plurality of sensors.

6. The apparatus of claim 1, wherein the vehicle computer further:
retrieves, via the real-time communication interface, information from the database server when the hazard is determined to exist in the environment.

7. A method for monitoring environmental conditions, the method comprising:
acquiring, at a first time by a vehicle computer of a vehicle, environmental information from a plurality of sensors of the vehicle, wherein the environmental information comprises a plurality of thermal images, a plurality of high-definition images, and gas and particulate information defining a condition of an environment in which the vehicle is traveling;
simultaneously acquiring, by a geolocation system, a location of the vehicle when the environmental information is acquired by the vehicle computer at the first time;
determining, by the vehicle computer and based on the environmental information, whether a hazard exists in the environment;
determining, by the vehicle computer when the hazard is determined to exist in the environment, whether the hazard is a low-priority hazard associated with the environmental information comprising information about structures in the environment, a medium-priority hazard associated with the environmental information comprising information about a change in lighting or weather conditions in the environment, and a high-priority hazard associated with the environmental information comprising information about a fire or a fallen tree in the environment;
storing, in a memory of the vehicle, the environmental information associated with the determined hazard along with a location of the vehicle at the first time when the environmental information is acquired;
displaying, via a display device inside the vehicle only when the hazard that exists in the environment is determined to be the medium-priority hazard or the high-priority hazard, an alert informing occupants of the vehicle of the medium-priority hazard or the high-priority hazard;
transmitting, via a real-time communication interface of the vehicle computer across a wireless communications channel and while the vehicle is in motion, in real time to a database server only the stored environmental information associated with the high-priority hazard when the hazard that exists in the environment is determined to be the high-priority hazard; and
transmitting, via a short-range communication interface of the vehicle computer, to the database server when the vehicle is stopped and is in range of the short-range communications channel only the stored environmental information associated with the low-priority hazard or the medium-priority hazard when the hazard that exists in the environment is determined to be the low-priority hazard or the medium-priority hazard.

8. The method of claim 7, further comprising:
detecting, by the vehicle computer, the hazard is the high-priority hazard based on data acquired from an air quality sensor of the plurality of sensors that detects an amount of gas in air of the environment, and wherein the amount of gas in the air indicates the hazard is the fire in the environment.

9. The method of claim 7, wherein storing the environmental information in the memory of the vehicle comprises generating, by the vehicle computer, a record comprising a time of detection of the determined hazard, a date of detection of the determined hazard, and the location of the vehicle at the first time, and wherein the method further comprises:
transmitting, via the real-time communication interface of the vehicle computer in response to determining the hazard that exists in the environment is the high-priority hazard, the record to an emergency service provider in real time.

10. The method of claim 9, wherein the high-priority hazard is the fallen tree blocking, or potentially blocking, a roadway in the environment, and wherein the low-priority hazard is poor air quality in the environment measured by an air quality sensor of the plurality of sensors.

11. The method of claim 7, wherein the information about structures in the environment comprises corrosion information associated with at least one of bridges, overpasses, and other structures crossing over a roadway in the environment that is detected by one or more of the plurality of sensors.

12. The method of claim 7, wherein the method further comprises:
retrieving, by the vehicle computer, information from the database server when the hazard is determined to exist in the environment.

* * * * *